Dec. 23, 1952          F. H. OWENS          2,622,496
CAMERA AND FLASH-GUN AND METHOD OF CONSTRUCTION THEREOF
Filed Jan. 22, 1946          7 Sheets-Sheet 1
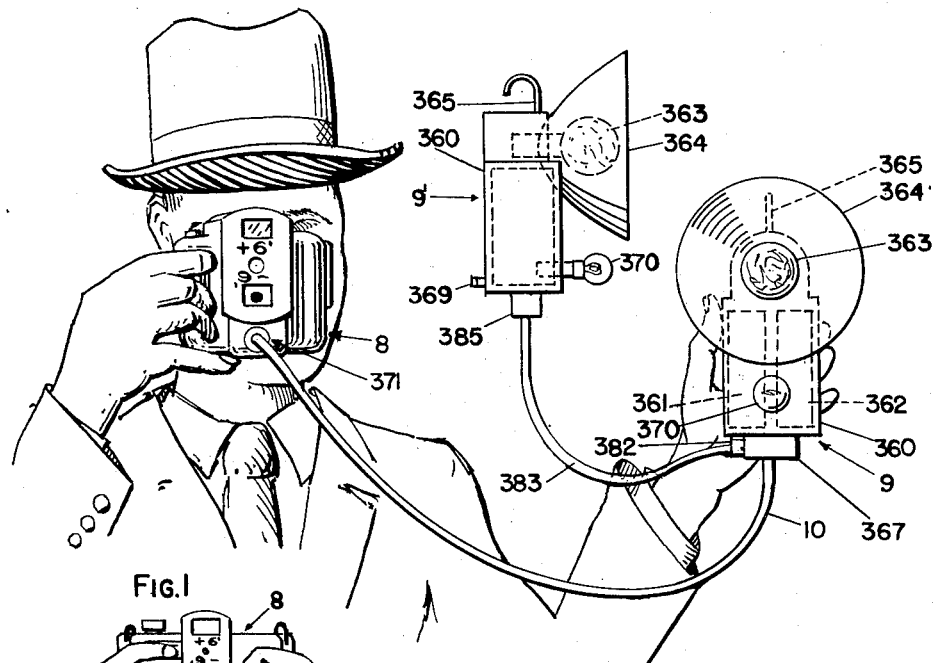
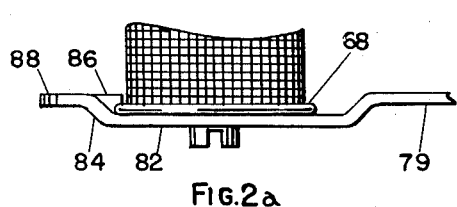
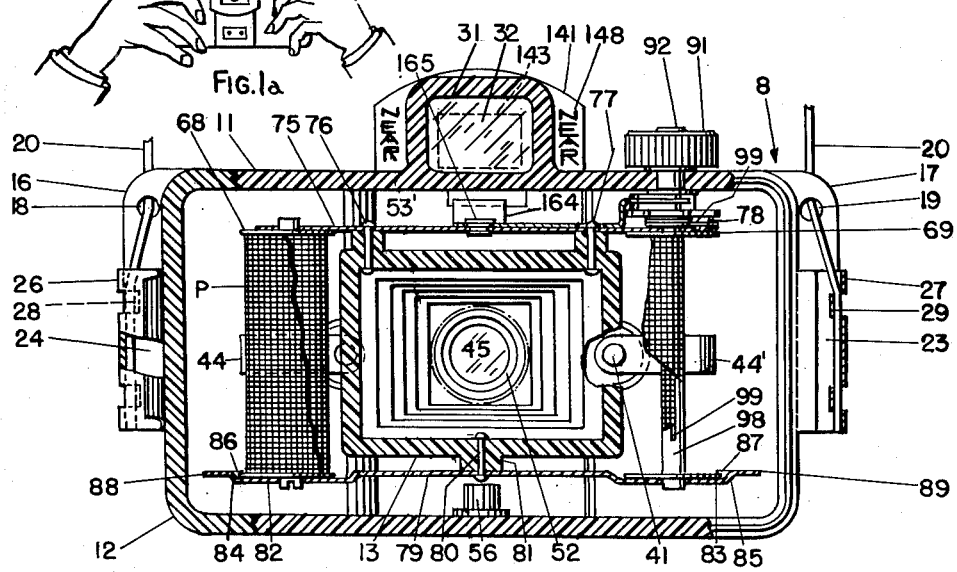
*INVENTOR.*
FREEMAN H. OWENS
BY Dec. 23, 1952　　　F. H. OWENS　　　2,622,496
CAMERA AND FLASH-GUN AND METHOD OF CONSTRUCTION THEREOF
Filed Jan. 22, 1946　　　　　　　　　　　　　7 Sheets-Sheet 2

*INVENTOR.*
FREEMAN H. OWENS
BY Warren Dunham Foster

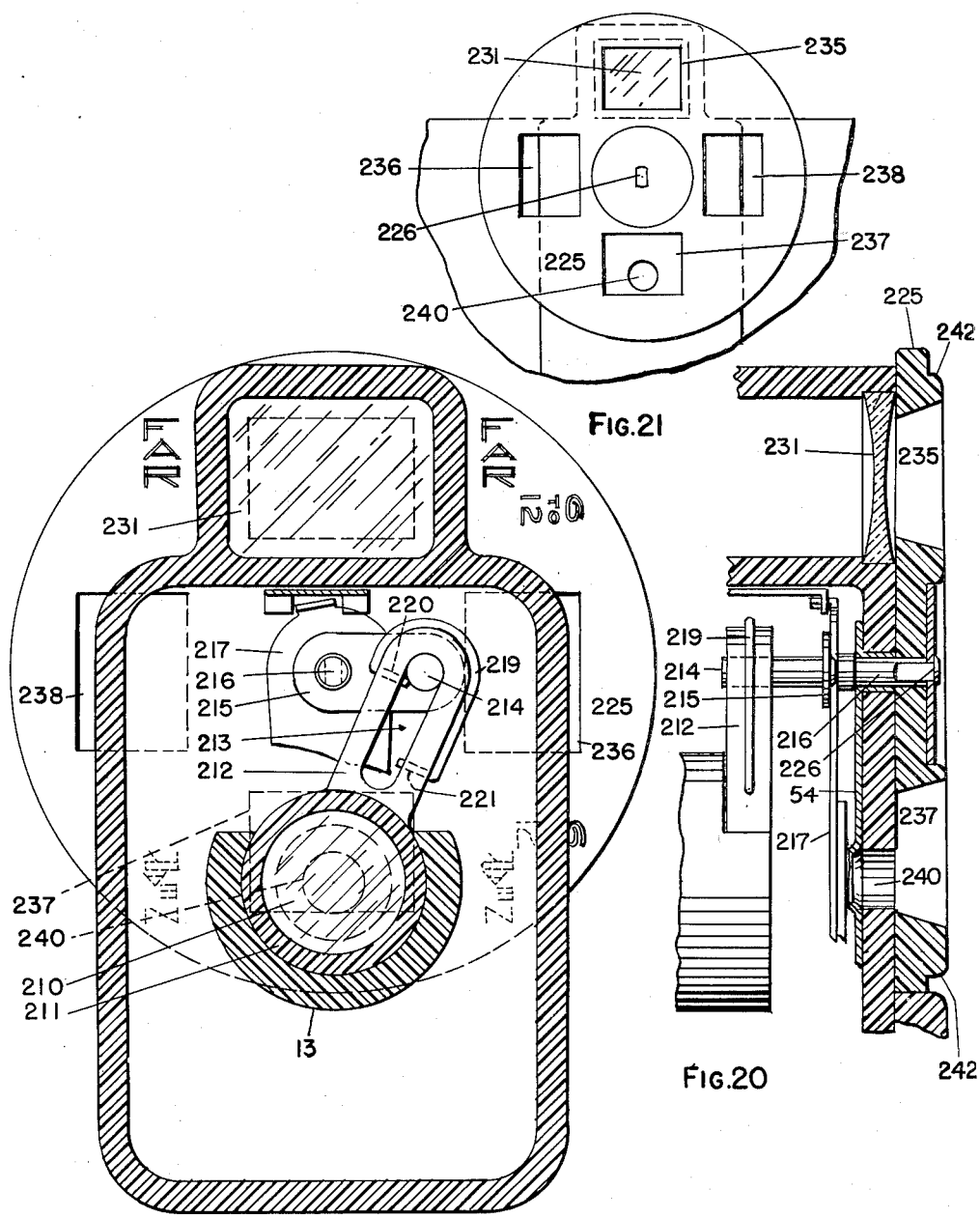

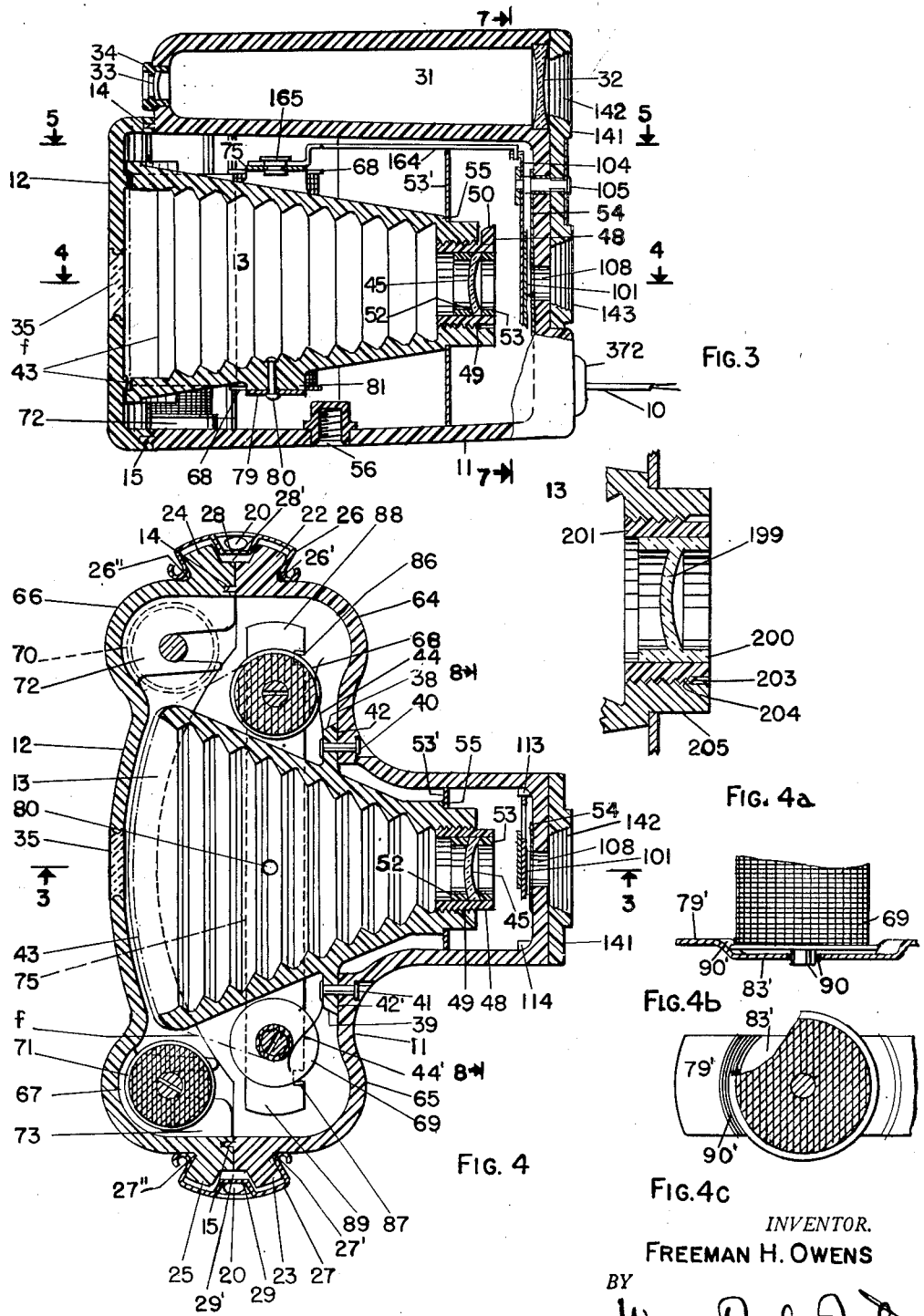

Dec. 23, 1952     F. H. OWENS     2,622,496
CAMERA AND FLASH-GUN AND METHOD OF CONSTRUCTION THEREOF
Filed Jan. 22, 1946     7 Sheets-Sheet 5
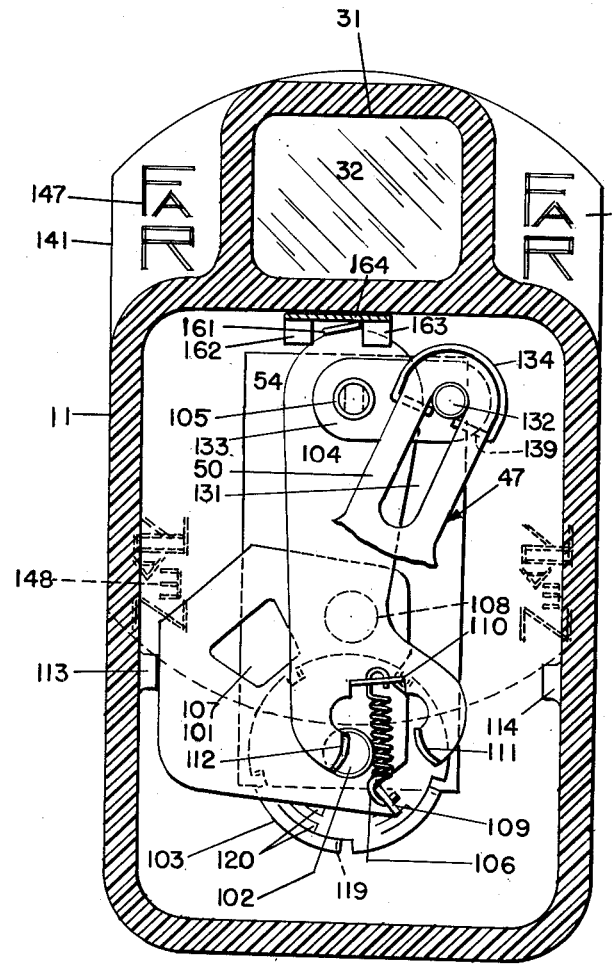
Fig. 7
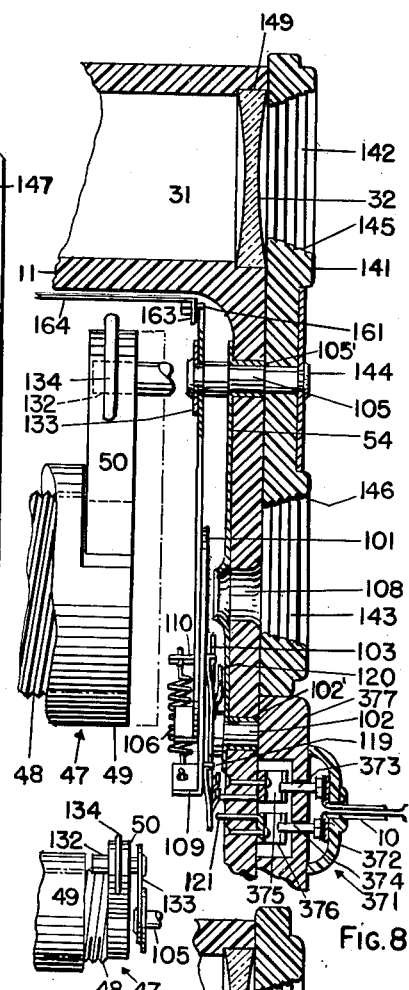
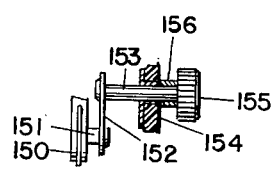
Fig. 12
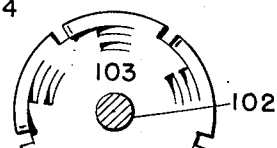
Fig. 10
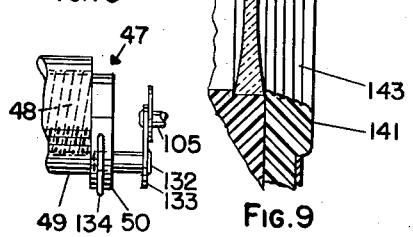
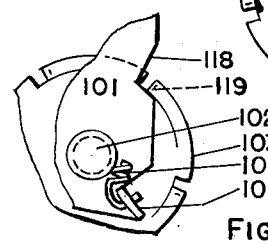
Fig. 13
Fig. 14
Fig. 11
INVENTOR.
FREEMAN H. OWENS
BY Warren Dunbaum Foster

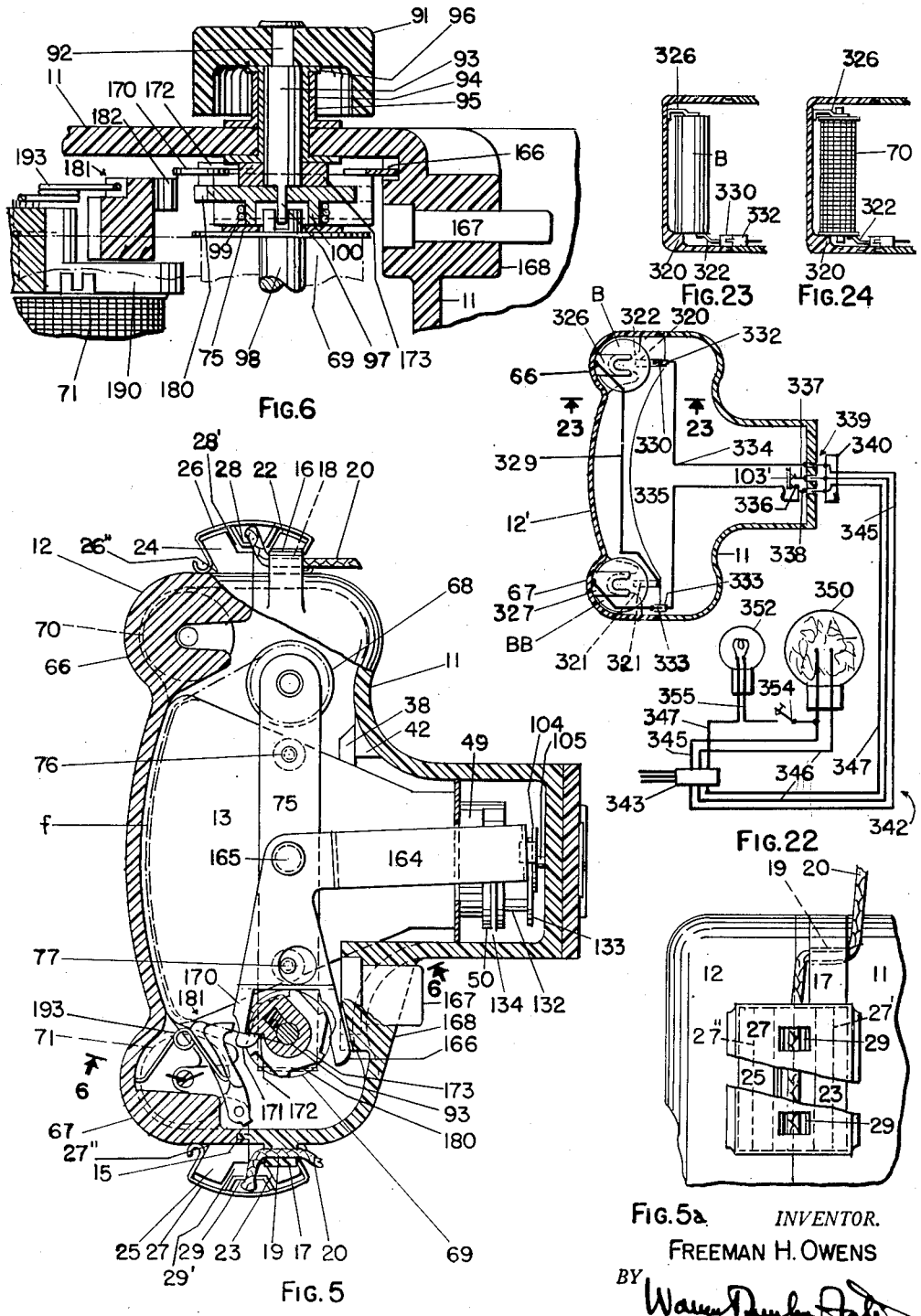

Dec. 23, 1952      F. H. OWENS      2,622,496
CAMERA AND FLASH-GUN AND METHOD OF CONSTRUCTION THEREOF
Filed Jan. 22, 1946      7 Sheets-Sheet 7
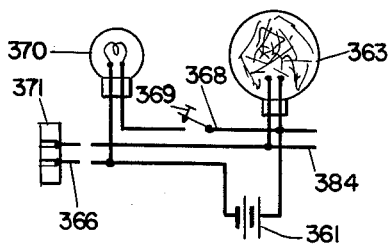
FIG. 25
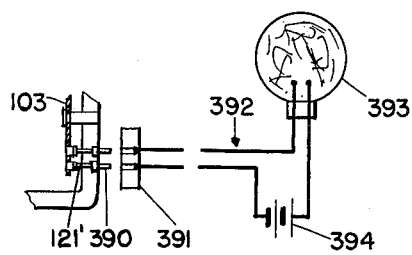
FIG. 26
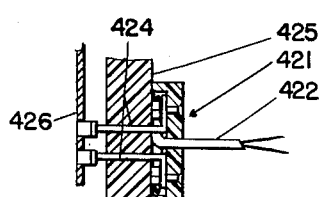
FIG. 29
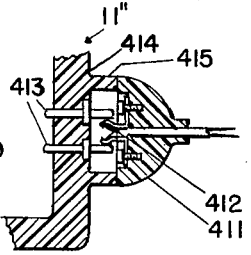
FIG. 27
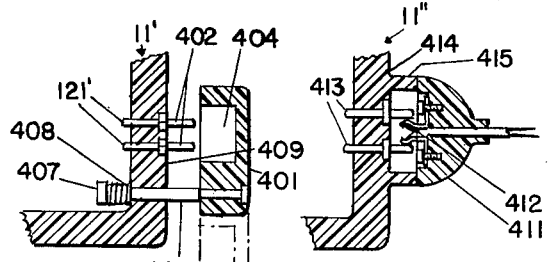
FIG. 28
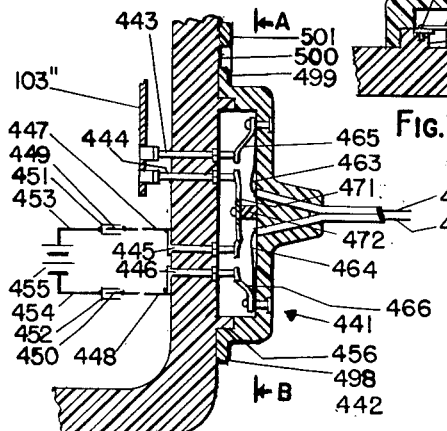
FIG. 30
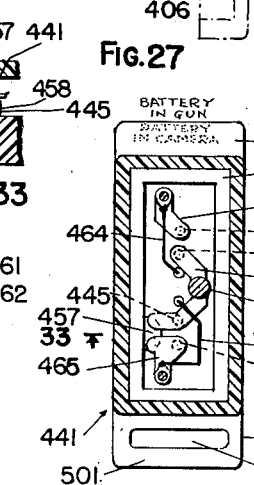
FIG. 33 / FIG. 32
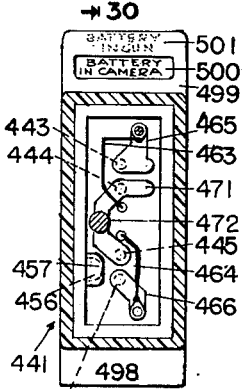
FIG. 31
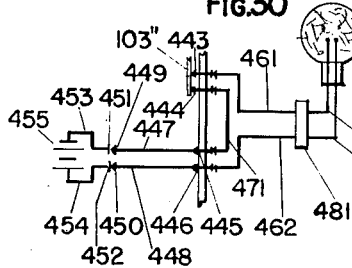
FIG. 34
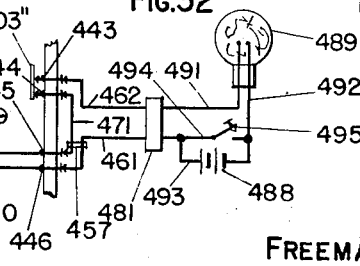
FIG. 35
INVENTOR.
FREEMAN H. OWENS
BY Warren Dunbar Foster

Patented Dec. 23, 1952

2,622,496

UNITED STATES PATENT OFFICE 2,622,496

CAMERA AND FLASH-GUN AND METHOD OF CONSTRUCTION THEREOF

Freeman H. Owens, New York, N. Y.

Application January 22, 1946, Serial No. 642,761

19 Claims. (Cl. 95—31)

One primary purpose of this invention is to provide a camera which is compact, easy to manufacture and operate, and very inexpensive but has characteristics and advantages which at the present time, so far as I am aware, are found only in apparatus which is complicated in construction and use and much more expensive. My invention lies in part in the provision of new and improved elements which make possible the accomplishment of my above described major aim and also in a new, improved and simplified combination of these parts into a small, cheap and highly efficient instrument for the taking of still photographs.

*Camera and flash-gun*

Another primary purpose of this invention is to provide a novel combination of a novel camera and a novel flash-gun, or alternatively, such a combination with a conventional flash-gun substituted for my flash-gun. My camera which is a part of this combination is only slightly more expensive than it would be without such features and, in fact, is less expensive than a conventional camera of comparable excellence in other respects, but it is so constructed and arranged that it especially and readily cooperates with a flash-gun. This flash-gun may be particularly adapted for use with my improved camera or may be conventional and may be purchased later than, or, if desired, at the same time as the camera. Moreover this arrangement enables a manufacturer of my devices to supply to his dealers a plurality of different models of cameras each having more or fewer of my novel features in accordance with the price of each together with a plurality of different flash-guns which a photographer may select for use in any combination which his purposes, tastes and pocketbook may suggest. Moreover, this invention includes the use of a plurality of flash-guns all of which are simultaneously operated under the control of my camera, the necessary source of electricity being disposed either in the camera or the gun. It also includes the provision of a flashlight for enabling a photographer as an aid to his own vision to apply light to a scene which he is about to photograph, this illumination being fed, if desired, by a battery within the camera but controlled independently of its automatic switching and synchronizing mechanism.

A related object of this phase of my invention is the conservation of all of the advantage of a built-in flash-gun but with the elimination of its inevitable disadvantages. The disadvantages which I avoid include the necessity that a user pay the extra cost for a flash-gun including a switch and synchronizer when he buys the camera, whether or not he can afford it or really then needs the flash-gun. I also make it possible for the user to avoid the extra weight and size of a combination instrument on those numerous occasions upon which he wishes to use natural illumination only, yet as negligible increase in cost or weight for the camera alone.

The versatility of this invention is such that I may utilize my novel camera with a battery assembled therewith or with my novel flash-gun which carries its own battery or with a conventional flash-gun or with no flash-gun, all necessary adjustments in current supply, switches and connectors being automatically or simply made by novel and improved devices.

As this statement of the objects of my invention proceeds, I shall explain those that are separately served by my camera and flash-gun as well as those which result from their combination.

*Grip and operation of camera*

My camera is designed particularly for amateur use with or without artificial illumination by persons who are unskilled in photography. For such individuals it is peculiarly important that the body of the camera be so arranged that a user may maintain a firm grip upon it while he is taking a picture. Also it is highly desirable that the control of the release of the exposure mechanism be such that its use will not result in the communication of movement to the camera as a whole thereby blurring the picture. Equally important is the provision of a design such that an unskilled or careless user is as little likely as possible to obscure the lens by the fingers of the hand or hands with which he holds the camera. A primary and related object of this invention is so to arrange and construct the parts that while a photographer holds the camera with such unusual steadiness he may observe the scene to be photographed through an optical viewing lens system.

My invention therefore includes among its important elements the provision of a camera structure of such a character that:

First, the user firmly and easily grips the instrument preferably with both hands while he is taking the picture thus holding the camera steady;

Second, to view a scene a user can easily hold my camera to his eye in one hand and operate the shutter to make a photograph by that same hand, thus making it easily possible for a one armed person to make good photographs with a minimum of trouble or for a normal person to hold my camera in one hand and a flash-gun in the other;

Third, the direction of movement of the control for the shutter is such that there is little likelihood of movement being communicated to the camera; and Fourth, instead of being tempted as it were to obscure the lens with his fingers the user can not do so without great difficulty.

The accomplishment of the above highly important objects follows the construction of the body of the camera of such size and contour that it can be effectively held to the eye by the fingers and thumb of one hand and effectively supports its operative and static parts and at the same time contains extra space which accommodates either films awaiting use or subsequent thereto or a battery for a synchronized flash-gun and a flashlight. This provision of a single set of related parts which accomplishes such plurality of results adds practically speaking nothing to the cost of my device or its weight or appearance of size and much increases its efficiency, even in those cases in which use is not made of a flash-gun.

Protuberances upon camera

Semi-circular protuberances upon vertical axes in the front and rear of each side of the camera body furnish the photographer a firm grip by which he may hold the camera to his eye to view a scene and make an exposure and also house a roll which is being exposed, the spool upon which it is being taken up and two additional rolls or alternatively two cells for a synchronized flash-gun, or flash-light bulb or flood lamp. Cost of special housings is thereby eliminated and a double purpose served by a single element. From the space between these protuberances a portion of the camera which carries the lens and shutter and devices for electrically controlling a flash-gun projects forwardly. This portion cooperates with the side protuberances in assisting the user to maintain a firm grip upon the camera. The forward projection itself is sufficiently long so that there is little danger that the photographer will extend a finger to obscure the lens. Between this forward protuberance on the right side and the forwardly projecting portion of the camera I place a control button for movement in a direction parallel to the longitudinal axis of the camera to release the shutter. The relation of this control button for the shutter release to the protuberances and the forward projection is such that it is convenient to the index finger of a user's right hand while he holds the camera to the eye steady in the manner described in this paragraph. These protuberances are formed by re-entrant curves in the side walls. When the user wishes to take a picture without artificial illumination he preferably grasps the camera firmly in both hands with the two thumbs about the rearward protuberances and the fingers, except one index finger which operates a button to control the shutter, embracing the forward protuberance.

Shutter release button

This shutter release control button is so arranged and connected that its movement is toward the body of the user when he makes the exposure. The physiology of the human arm, hand, fingers and thumbs is such that the only easy and natural position in which a person can grip any object such as a camera is by holding it by a vertical member. That is, any part which is held before the body of a user should be grasped with a vertical rather than a horizontal grip to prevent muscular effort and strain. Such effort and strain in holding a camera inevitably increases the likelihood of unsteadiness of a picture. I so position my control button that operative movement of that button is toward the body of a photographer. As a user grasps and holds the camera to his eye to view a screen in this natural position the index finger of his right hand is so disposed that its normal movement against the control button is backwardly in a substantially straight line. As the index finger so moves, the button is working in direct alignment with the thumb of the same hand which grasps the rear vertical protuberance and thus tends to overcome any possible bodily movement of the camera. The other fingers and the palm of the hand assist by their grasp of the front protuberance. As a consequence the possibility of jarring the camera and thus spoiling the picture by blurring is removed of course barring gross carelessness or an accident. It will be noted that the above described contour of my camera which serves its double purpose and the arrangement of the control button in relation thereto directly cooperates with movement of the control button to accomplish this result.

Since a user thus can firmly grip my camera with one hand and because of other features which will later be described the likelihood of jarring the instrument and hence spoiling the picture is for all practical purposes removed. This arrangement which is characteristic of my invention may advantageously be added to cameras which do not have all of these features. In such cameras movement of the control button in a line along the optical axis tends to cause the camera as a whole and hence the film as it is exposed to move in a direction along the optical axis and not transverse thereto. Transverse movement communicated to the camera at the instant of exposure causes more damage to the picture than movement along the axis. Depth of coverage of the lens is such that moderate movement directly along the axis may result in no visible defect in the picture while the same amount of movement transverse to its axis causes unsteadiness. It will of course be understood that I much prefer to eliminate the practical possibility of bodily movement but in such cases as all of my invention contributing to that end is not employed the above part of it will be useful.

Other still cameras known to me when actuated by a movement of a button in a plane normal to the optical axis unless operated by a skilled photographer or upon a tripod cause movement which is harmful to the resulting negative.

The presence of this rightward protuberance in close proximity to the shutter release control element makes possible effective cooperation of the camera and my novel combination of flash-gun and camera. By the use of the right hand only a photographer firmly grips the camera by this protuberance with the index finger left free to manipulate the shutter release control button. It will be noted that the fingers of the photographer grasp the forward vertical protuberances while his thumb securely holds the rearward protuberances. Simultaneously he may hold my flash-gun in his left hand. He may readily position the camera to the eye so that he uses the finder as he is making an exposure, the making of the exposure being effective to close the circuit to the flash-gun, the battery being mounted either in the camera or in the gun unit. If desired while still holding both camera and flash-gun in picture-taking position a photographer may use the free index finger of the left hand to close and to open a circuit to a flashlight, which is fed by the same battery as the flash bulb but independently controlled.

Control of shutter

Movement of this single shutter release control button as above described is communicated to my new and improved shutter and the switch for a flash-gun by a highly simplified control lever and its few associated parts. The shutter itself, as well as the control mechanism therefor, is also unique so far as I am aware.

In the prior art known to me shutters of this general type are ordinarily released by a first spring and thereafter reset by a second spring which of course must be stronger than the first spring since it must overcome the power of the first spring. As a result such shutters are operated by opposed and antagonistic spring pressure with the result that a user when he releases the first spring to take a picture must apply sufficient pressure to tension both the first spring which currently releases the shutter and the second spring which later resets the shutter. As a result, the increased power which the user must apply to the camera is much more likely to move the camera and hence secure a negative with a blurred image. In my improved shutter, however, I completely eliminate the stronger or resetting spring. I employ only one spring which except at the instant before the exposure is under very light tension. The only purpose of this spring is to form a toggle which is broken in order to give an exposure the timing of which is automatic and not under the control of the photographer. This shutter is reset as the photographer winds the film to the next frame in order to be ready to take the next picture.

Winding of film resets shutter

An important characteristic of this phase of my invention is that the shutter release control button by which a photographer makes an exposure and simultaneously illuminates the scene by a flashlight if desired is reset not by spring pressure as is common in this art but by a subsequent act of winding the film to bring a new portion thereof in position for a subsequent exposure. Therefore it will be seen that in the resetting operation as well as in that of taking a photograph it is the fingers of the photographer and not the power of the opposed springs which operate the shutter.

This construction is much more simple, direct and inexpensive than any other which is known to me. It will of course be understood that this arrangement inherently prevents double exposure since the shutter cannot be reset except after a user has operated a film winding knob to advanced unexposed film. Complicated mechanism to accomplish this general result is old in this art but so far as I am aware this invention represents the first device of this type which is sufficiently inexpensive so that it can be embodied in a camera to be sold at or near the lowest price level.

One reason why I can so construct a camera with this important feature and still sell it at a very low price is that I reset the shutter by one revolution only of a take-up spool and provide a frictional arrangement whereby a photographer can revolve the take-up roll as much more as may be required to complete the transport of a full frame or picture as conventionally shown by the appearance of the exposure number on the paper on the outside of the film at a colored window at the rear of the camera. The diameter of a film upon a take-up roll rapidly changes as it builds up. Hence much greater rotational movement is required for a nearly empty spool than for one which is largely full. For this reason all previous devices such as this known to me have made use of elaborate and costly mechanism to compensate for these differences of diameter. I save all this complication and expense. For all practical purposes my arrangement is equally effective for the danger is not that a user will fail to wind up the film until a number appears once he starts as that he will forget to wind at all.

Switch for flash-gun

Associated with the shutter and mounted upon its shaft and operated by it is a simple inexpensive and improved switch or brush for operating a flash-gun. This is one of the elements which make it possible for this camera to be sold for use with a flash-gun without adding more than a negligible amount to its cost.

A novel and important phase of this aspect of my invention is the provision of means whereby this mechanism closes and thereafter instantly opens a circuit to a flash-gun only when the shutter is operated to take a picture and is without effect upon it at all other times including that at which the shutter is reset.

Positioning of photographic lens

My invention also includes the positioning of a photographic lens within the camera body back of this shutter and of the plane of this switch for the flash-gun. That is to say except when a picture is being taken the shutter is disposed between the lens and the exterior of the camera. Thus the lens is protected from dirt and much more important from the fingers of a user of the camera. Unskilled attempts to clean lenses and their purposeless fingering are common causes of poor pictures. These difficulties and that of dirt are completely avoided by this phase of my invention.

An exposed lens when made of conventional optical glass suffers much from dirt and thoughtlessness but a plastic lens, being much less hard, suffers much more. It will therefore be understood that a camera constructed in accordance with this invention with the lens inside the camera has unusual advantages when use is made of a cheaper plastic lens whether or not such a lens is of the novel type described and claimed in my co-pending application Serial Number 629,018, filed November 16, 1945, or is made in accordance with the methods thereof.

Use of plastic lens

When I use my novel plastic lens I much prefer to position it along its optical axis when my camera is manufactured in accordance with a novel method which forms one of the objects of this invention. According to the principles and practices of my said co-pending application I form a plastic lens integrally with a supporting and protecting rim or annulus. I place the annulus and lens within a cylindrical tube which forms a part of my novel and improved lens holding device. I then move the annulus along the inside of the tube until it is in proper optical relation to the image-receiving surface, such determination if desired being made by conventional photo-electrical methods. As described and claimed in said co-pending application but not shown herein the provision of an accurate positioning annulus integral with the lens itself and a cooperating stop make unnecessary this conventional and expensive step. Then this structure is fixed with the lens in the correct position. The annulus protects the lens portion of the unitary structure from possibility of damage. Alternatively I may position my novel plastic lens as illustrated herein or a conventional glass lens between two plastic annular rings which are slightly heated. Upon cooling they hold the lens in place.

Alternatively if I employ a glass lens I place it in the correct position as above and hold it there by small rings of plastic, one disposed upon each side of the lens and both heated just before this assembly so that upon cooling they are joined to the inside of the cylinder and firmly hold the lens in place.

Setting of photographic lens by movement of mask for finder lens

It is highly desirable to provide means whereby the field of a finder lens is modified in accordance with the position to which an associated photographic lens has been moved to focus the camera thus preventing the difficulties due to unwanted parallax. To accomplish such ends I present novel and highly simplified means for moving a plurality of masks into and out of cooperative relation with a finder lens in accordance with a movement of the photographic lens which changes the focus of the camera. I prefer to move the photographic lens by an eccentric, the pivot as well as the operating devices being common to the lens moving device and to that which rotates the respective masks into and out of cooperative relation to the finder. My invention, however, includes such a movement of the lens itself without interlocked relation with a mask. A related object is to give to a photographer clear and unmistakable indication of the current position of the lens, indicating whether, for example, the instrument is focused for near or far photography.

This construction of mechanism controlling a lens has many advantages among which simplicity, rigidity and cheapness are numbered. This arrangement eliminates gears and racks with their associated bearings and substitutes simple and cheap stampings and rods, yet it is positive and sturdy. A very great advantage is the freedom which it gives to the designer who is thus enabled to place his lens control knob anywhere within reason he desires. If conventional racking mechanism is employed to focus the lens, however, the designer must place a control knob or the like at a point upon the exterior of the camera along a projection of a line adjacent and parallel to the periphery of the longitudinal axis of the lens mount or employ gearing or other complicated and expensive mechanism to connect the lens racking gears with a laterally distant knob or rely upon direct movement of an accessible portion of the lens mount.

Stop for film wind when all pictures taken

A common difficulty which affects the inexperienced or careless photographer is prevented by novel and highly simplified means. When the film has been completely wound upon the take-up spool I make it impossible for a photographer to attempt to continue to wind and to attempt to take additional pictures upon non-existent film thereby preventing a frequent source of disappointment and annoyance. This device also prevents a frequent cause of loss of pictures which have already been exposed. Inexperienced or careless photographers making use of conventional apparatus often fail completely to wind up the film upon the take-up spool after the last picture space represented by the highest number upon the paper backing of the film has been exposed. These attempted exposures not only result in no negative but they also fog the final exposures which have been made in due course. By means of this arrangement I assure a photographer complete use of the entire roll of film since he knows that he must continue to wind until another number upon the backing paper appears at the window or the take-up is locked. I accomplish the above results by parts and methods of assembly which are highly simplified and inexpensive. The provision of such parts and methods is among one of the important objects of my invention.

Multi-purposed parts

One reason why I am able at a low cost to furnish a camera which has these improvements is that I so design a relatively large proportion of the relatively few parts which are necessary for these new results as well as for conventional operations so that they accomplish a plurality of purposes. Similarly I have greatly simplified the construction and mounting of certain of the elements and sub-assemblies of the camera. Such improved and novel arrangements are applicable to many arts other than the photographic.

One example within the ambit of this object of my invention is the making of a pintle for a master control plate of a lock which blocks operation of the camera when the film is completely used in the form of a narrow leaf spring operating in an oversized opening in the plate and held in position merely by being slipped into two slots aligned but spaced more closely than the length of the spring, the bowing of the spring as it is pushed into the slot being all that is necessary to assemble the plate in the camera.

For another example, I employ a common pivot pin for the shutter operating plate, a lens focusing lever and the masks which avoid the evils of parallax. Also, I prefer to construct as one piece a mounting which holds the lens and its control arm. One simple wire spring alone serves most excellently for latching both the lens and finder masks in either two or three operating positions.

The film which is thus advanced past a lens within the camera is supported and maintained in position by a single resilient member which is so formed as also to act as a holdback or tensioning agent to maintain the film taut in the exposure position, thereby accomplishing a plurality of results with a single part which is both simple to manufacture and assemble and even more important highly simple to use.

By reason of savings secured by arrangements such as the above, which are illustrative only, I am enabled to supply a camera having the operating features which I am describing herein at a cost no greater or even less than that of a device without them.

Housing

I prefer to mount the operating parts which make up my camera in a novel and simplified housing the parts of which are assembled in a manner which so far as I am aware is new as well as improved. All of the parts of my entire camera including the control mechanism and, if desired, the cells for a flash-gun, are carried by a housing which comprises a front member, a back member and an internal support or cone. These elements together with a single baffle plate and one mounting plate for a shutter comprise all of the static or supporting parts of my entire picture-taking device thus materially reducing not only the cost of parts but also and more important that of assembly and of servicing if repairs should become necessary. Certain of the relatively few parts which make up my invention are first mounted, generally in the form of sub-assemblies, upon each of these three main supports. I utilize single pins or shafts to accomplish a plurality of purposes. For one example, a single pin supports the shutter and a switch and helps position the mounting plate. For another, one rotatable shaft supports the rotatable finder mask, helps position the mounting plate, supports the shutter operating plate, and moves the lens to focus the instrument. Then after the parts have been so mounted the inner support or cone, in the form of a frustrum of a pyramid, is placed within the front support and two rivets or screws applied, which serve another purpose also. The elements which are mounted upon one support which cooperate with elements upon the other merely slip into appropriate openings. After my camera has been placed in service, a photographer of course must separate the front and back members frequently in order to take out a used film and put in a fresh one. To that end I provide a very simple and improved spring grip which also serves as a mounting by which a cord which supports the camera is fastened to it.

Such frequent separations and reassembly of the two parts of the camera are related to another important object of the invention. Those skilled in this art readily recognize that balance in any camera which as this will ordinarily be held in the hand is of great importance. Since the shutter, lens and associated mechanism are placed well forwardly from the portion of the camera which is grasped by the hands of a user it is important that the leverage caused by their weight in this position be counterbalanced by the positioning of the heavier elements of the device as it is ready for use well to the rear and relatively adjacent the hands of a photographer. For that reason as well as others I much prefer to place the cells for a flash-gun in the rearward portion of the camera, which because of my double use of this storage space may also alternatively accommodate the stored rolls of film. The control mechanism therefor, however, as previously stated is associated with the shutter and hence must be placed in close proximity thereto and in the forward portion of my camera. For these reasons an electrical circuit within the camera must include elements in both of these separable portions. An important object of my invention is to provide means whereby this circuit may be readily and automatically broken and made each time a photographer separates and reassembles the two sections of the camera.

Electrical connections

Since according to this invention as has been described a battery for a flash-gun may be carried by my camera upon some occasions and by the gun itself upon others, it will be understood that either element of the electrical connecting means disposed between the camera and the gun may be "live"—that is, carry current. I supply simple and automatically operable means for making such connections without danger of shorting the battery.

One preferred device by which I carry out this object of my invention consists of a cover for connectors which projects beyond a surface of the camera and mounting means therefor whereby the cover is readily movable between protective and working positions while always remaining attached to the body of the camera so that there is no danger of its being lost or mislaid.

Another construction by which I effectuate this object is a simple protective annulus for such prongs which cooperate with a spring plug.

According to one embodiment of this phase of my invention and preferably for use when the battery is ordinarily carried within the camera I provide a plug having male connectors of such length and relative position that when the plug is inserted the connectors reach through the front wall into position to be directly engaged by a circuit-making disc or plate of my improved switch. When a user does not wish to employ artificial illumination he does not insert the plug. Consequently at this time the movable circuit-making portion of the switch moves freely without frictional or other contact thereby saving wear and power. Also it will again be noted that I eliminate the cost and complications of parts which are ordinarily employed but retain their function.

Another preferred modification of this phase of my invention includes a specially constructed connector which when placed in one relation to my camera adapts the electrical devices of the camera to operate a flash bulb which is fed by a battery within the camera but when placed in another position upon the camera adapts these electrical devices to operate a flash bulb which is fed by a battery placed within the gun, all projecting connectors being protected in each instance. I accomplish these results by providing two pairs of projecting contact elements, one pair connected to a circuit including the switch disposed within the camera and the other pair connected to a circuit within the camera which when desired may contain cells. Within my novel plug I provide wires which connect one member of each of the above pairs of contacts and hence one leg of each of the circuits within the camera with an external circuit feeding a bulb in a flash-gun and also a shorting plate which connects the other member of each pair of contacts and hence the other legs of each of said circuits to each other. Another shorting plate is carried forwardly of the camera in such position that when the plug is placed in one relation to the camera it connects the shorting plate of the plug and one of the leads therewithin which feeds the switch thereby placing the external circuit served by the plug in electrical relation with the switch only. Hence the flash-gun in this circuit is controlled by the switch of the camera but otherwise is independent of it and of the circuit within the camera which at that time may or may not contain cells. This plug is so arranged that when it is turned over the shorting plate of the camera does not affect the plug. Hence the circuit from the flash-gun includes both the switch and the feeding circuit of the camera, thus feeding the flash-gun from the battery within the camera through the switch.

Battery for flash-gun

As previously made clear an important object of my invention related to the foregoing is to furnish a flash-gun which in addition to illuminating the scene with an intensity sufficient for photographic purposes also supplies artificial illumination which enables a photographer to examine his subject before he makes an exposure and to study such aspects as the formation and effect of shadows and other details of composition. According to a preferred embodiment of this invention the battery which feeds both the flash-gun for photography and the flashlight for general illumination and the switch which controls the circuit to a flash-gun are carried by the camera. Since a photographer wishes to use the flashlight at times other than the instant of exposure my invention includes means whereby I control the flashlight independently of the automatic control of the flash-gun by the camera but preferably by electrical instrumentalities which in part are joint with those for the flash-gun.

For many purposes I prefer to embody all of the several elements which I have described above in a single camera or to place them in association therewith since each part cooperates with all other parts in a manner which will be generally understood from the above statement and specifically pointed out in the more detailed portion of this specification which follows. It will be readily understood, however, that each of the improved elements of this invention if desired may be employed without the others. Moreover, under certain circumstances I may prefer to substitute either conventional or other novel elements for those which are described herein.

Objects of invention

The objects of my invention will be understood from the general statement above as well as from the specific description which follows. These objects include the provision of a camera preferably for use by an amateur which may be sold at an extremely low price but has the certainty and efficiency of operation and results of a conventional instrument which sells at many times its price. Characteristics among many others of my invention include an arrangement of parts and body which simultaneously provides a firm grasp, protection of the lens, removal of likelihood of spoiling the picture by jarring, convenient operation, storage space for films or cells, the prevention of double exposure, setting of the shutter by a winding operation, the blocking of attempts to wind more film when the film is exhausted, prevention of fogging of a film, holding of a film in proper relation to the focal plane, elimination of parallax, joint adjustment of focus and movement of masks defining the field of the finder lens system, clear visual indication of current focus of the instrument, devices for synchronizing a flash-gun and for electrically connecting flash-gun and camera, and improved electrical and operational elements of many kinds.

I accomplish all of the foregoing results in a camera and flash-gun the parts of which are most simple and inexpensive to manufacture and assemble. Such a camera is compact, easy to hold and operate, durable, and gives to the user the assurance that no matter how great his inexperience he is more than reasonably certain of securing good pictures.

Other objects, characteristics and advantages of my invention will be clear from the following portion of this specification, the attached drawings, and the subjoined claims. While for purposes of illustration I am showing preferred forms only of my invention, it will be readily understood that changes may be made therein without departing from the spirit of my invention or the scope of my broader claims.

Drawings

In the drawings:

Figure 1 is a view of my improved and simplified camera in combination with may associated novel flash-gun both held in picture taking position, certain parts being omitted for clarity.

Figure 1a is a sketch which shows how a user may grasp my novel camera when it is not employed with a flash-gun.

Figure 2 is a view, partially broken away and partially in section, of the front portion of my camera looking forwardly, the cover having been removed.

Figure 2a is a fragmentary sketch illustrating combined supporting and braking means for a roll of film.

Figure 3 (Sheet 2) is a vertical central section partially broken away taken on the line 3—3 of Figure 4 and looking in the direction of the arrows, certain parts being omitted for clarity.

Figure 4 is a horizontal section taken on the line 4—4 of Figure 3 and looking in the direction of the arrows.

Figure 4a is a fragmentary and enlarged vertical section which illustrates a preferred variant lens and holder and method of their assembly. Figure 4b is a sectional view and Figure 4c a top plan of an alternative construction for supporting a spool.

Figure 5 (Sheet 3) is a top plan view partially in section taken on the line 5—5 of Figure 3 and looking in the direction of the arrows.

Figure 5a is an enlarged fragmentary side elevational view showing my novel arrangement of lock and support viewed from the right hand side of the camera.

Figure 6 is an enlarged section taken on the line 6—6 of Figure 5 and looking in the direction of the arrows.

Figure 7 (Sheet 4) is a vertical view of the front of the camera looking forwardly partially in elevation and partially in section taken on the line 7—7 of Figure 3 and looking in the direction of the arrows. In this figure the lens and mask are set for a far position.

Figure 8 is an enlarged vertical side view largely in section taken on the line 8—8 of Figure 4 and looking in the direction of the arrows. It shows a preferred arrangement of masks, lenses, and shutter and the operation of the switch for a flash-gun, the optical parts as in Figure 7 being in the far position or infinity.

Figure 9 is a fragmentary view corresponding to the upper portion of Figure 8 but showing the mask for the finder lens in the near or close-up position.

Figure 10 is a fragmentary top plan view illustrating the control of the position of the lens and pivot for the mask and corresponding to Figures 7 and 8 in that it shows the optical parts arranged in the far position.

Figure 11 is a fragmentary top plan view corresponding to Figure 9 and showing the parts in the near or close-up position.

Figure 12 shows a variant of my invention wherein by eccentric mounting I control a photographic lens only. It corresponds to Figure 11 as to setting.

Figure 13 is a detailed view of a single disk which serves as brush or circuit-making element for a switch for a flash-gun.

Figure 14 is a fragmentary view corresponding in general to Figure 7 but showing the operation of the brush.

Figure 18:
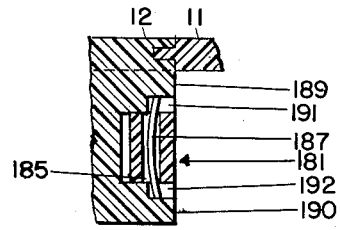
Figure 18 is a sectional sketch showing a preferred mounting for my control device for film winding.

Figure 19 (Sheet 6) corresponds generally to Figure 7 and shows in vertical transverse section an embodiment of that phase of my invention wherein a lens is movable other than between two positions only together with automatic devices to prevent parallax.

Figure 20, which corresponds generally to Figure 8, is a front vertical view largely in section of the subject matter of Figure 19 and taken along the longitudinal axis of the camera.

Figure 21 is a reduced front elevation which illustrates an improved turret for use with this form of my invention.

Figure 22 (Sheet 3) is a horizontal view largely in section and including a wiring diagram which shows a variant of my invention wherein I mount a storage battery, interchangeably with extra films, within the body of the camera, and control a flashlight fed by the batteries housed in the camera independently of the actuation of a flash-gun.

Figure 23 is a fragmentary section taken on a line 23—23 of Figure 22 and looking in the direction of the arrows. It shows a cell for a flash-gun associated with the camera in a position within my camera which may be occupied either by such a battery or by a spare roll of film. It also illustrates automatic contact-forming arrangements.

Figure 24 corresponds to Figure 23 but shows an extra roll of film in place.

Figure 25 (Sheet 7) is a wiring diagram of my novel flash-gun and flashlight as shown in Figure 1.

Figure 26 is a wiring diagram of a conventional flash-gun in combination with the electrical controlling devices of my camera.

Figure 27 is a vertical section of a novel device for protecting live electrical connectors extending beyond the face of a camera when they are not in use.

Figure 28 is a vertical section of a preferred and simplified variant for accomplishing the result of Figure 27.

Figure 29 is a vertical view largely in section showing a novel connector for attaching a flash-gun to a camera wherein male elements of the connector make direct contact with a circuit-closing brush of the camera.

Figures 30 to 35 both inclusive illustrate novel connecting means especially adapted for use with a camera which embodies means for closing a circuit for a flash-gun for selective use with a camera carrying a battery and a flash-gun without a battery and alternatively with a flash-gun having the battery.

Figure 30 is a vertical view largely in section of the device described above.

Figure 31 is taken upon the line AB of Figure 30 looking in the direction of the arrows but with the connector arranged for use with a camera having a battery and a flash-gun having no battery.

Figure 32 corresponds to Figure 31 but shows the connector in the position in which it is placed when the battery is carried by the flash-gun and not by the camera.

Figure 33 is a section taken on the line 33—33 of Figure 32 and looking in the direction of the arrows.

Figure 34 is a wiring diagram corresponding to Figure 31.

Figure 35 is a wiring diagram corresponding to Figure 32.

The words "right" and "left" and their derivatives as used herein are from the point of view of a user of one of my cameras held so as to take a photograph, except as stated. The words "upper" and "lower," "forward" and "back," and "front" and "rear" and the like are similarly employed, except as noted. When the same or similar parts appear upon each side of the camera or a portion thereof those upon the left are ordinarily designated by an even reference character and those upon the right by an odd number one higher.

*Association of camera and flash guns*

Reference to Figures 1 and 1a will indicate how a photographer simultaneously and effectively in one hand holds and operates a camera generally indicated as 8 and in the other holds one of my novel flash-guns generally indicated as 9, the two being electrically connected by a cord 10. Another flash-gun 9' is shown, also controlled by the camera. The index finger of the right hand of the user is so disposed that it readily operates the shutter of the camera, such operation being effective not only to make an exposure but also to close the circuit to the flash bulb. The two middle fingers of the right hand firmly grasp the rightward front protuberance of the camera while the little finger of that hand supports the camera from below and the thumb grasps the camera from the rear. It will be readily seen that in this manner the photographer can firmly grasp the camera and look through the finder at the very moment of making an exposure. In his left hand the user holds the flash-gun 9 and without relaxing his grip upon either the flash-gun or the camera is enabled to use a free finger of the left hand to manipulate the switch of an auxiliary flashlight. As later described in detail I may prefer to use a plurality of flash-guns simultaneously operated. As shown a second flash-gun 9' which may be hung upon a convenient support is electrically connected with the first and operated upon the same circuit. This figure also shows how a one-armed man can readily and instantly hold and operate this camera without the use of a tripod.

Housing and lock

The housing for my novel and improved camera 8 consists essentially of a front support 11, a rear support 12 and an internal support or "cone" 13 which is rectangular in cross section. The front and rear portions dove tail as at 14 and 15 and are held together in a manner which is about to be described. Bosses 16 and 17 extend outwardly on each side of an upper portion of the front support. They are pierced with openings 18 and 19 respectively for the reception of a single supporting cord 20. These bosses extend downwardly to form two ears 22 and 23 which are angular in cross section and extend outwardly from the body of the support and preferably are formed integrally therewith. Two corresponding ears 24 and 25 extend outwardly from the back support and are oppositely positioned. Spring clips 26 and 27 slip over each set of oppositely disposed ears and engage grooves 26', 26'', 27', and 27'' respectively which are formed at the junction of each ear and the body of the camera, the resilience of the clips being sufficient to hold the two sections together in light-tight relation. Each end of cord 20 after it passes through the above openings is attached to the interior of the clips by portions 28 and 29 thereof respectively which are first bent inwardly from the body of each of the clips and then clamped upon the cord. The portions of these ears which are relatively adjacent upon assembly are so designed that they then form grooves or reentrant surfaces 28' and 29' respectively for the reception of portions 28 and 29. Thus a cheap, certain and simple method of assembling the cord and clip is provided. See Figures 2, 5, and 5a.

The operation of this phase of my invention will be clear from the above description. When a user removes the back to take out an exposed film and put in a fresh one he merely slips the spring clips 26 and 27 downwardly off the ears. Since the cord 20 is attached both to the clips and to the body of the camera through the holes 18 and 19 in the bosses 16 and 17 there is no possibility of the loss of the fastening devices or of the separation of the cord from the front of the camera. After the desired change of film the two parts are merely assembled again, the spring clips placed in position and the camera is again ready for use. Note that the clips 26 and 27 ride upon ears 22—24 and 23—25 respectively and are held against unwanted upward movement by engagement of their upper edges and the shoulders formed by the junction of the upper edges of grooves 26' and 27' and the lower edge of the boss formations 16 and 17. It will be understood that bosses 16 and 17 are preferably formed integrally with ears 22 and 23 respectively.

Inner support

Support 11 includes a chamber 31 at the top thereof at the forward end of which is inserted one element 32 of a finder lens combination, this element being held in place as later described in connection with mask 141. At the rear of this chamber another element 33 of the combination is held by a mounting 34. A window 35 equipped with red safety glass or a plastic sheet is inserted in the rear support 12 so that a user may observe the number of the next picture to be exposed. It will be understood of course that I prefer to cast this front support in one piece, preferably by making an injection moulding of a synthetic resin, but, if desired, it may be built up element by element.

As is best shown in Figure 4, the central supporting cone 13 is formed in the form of a frustum of a pyramid with forwardly facing ears 38 and 39 which as by pins 40 and 41 are assembled in operative relation with appropriate backwardly facing bosses 42 and 42' upon the front support 11 as previously described. A rear surface 43 of this cone embodies an exposure window (Figure 4) which is aligned with a photographic lens 45 mounted in the forward portion of the cone. The rear surface of this window furnishes a smooth platen or gate over which the film travels. Light leaf springs 44 and 44' which bear against one surface of the backing paper P of this film, or of the film if my invention is applied to a camera for use with films not having backing paper. These springs are held in place by the rivets which join the cone and the front portion of the camera.

Before I place the cone in position within the front support of the camera I prefer to mount the lens in the cone. I place the lens in an irregularly shaped member (generally indicated as 47) which comprises a barrel 48 having an external thread which cooperates with internal threads 49 formed in the forward portion of the cone 13 and an upstanding irregularly formed control arm 50. The operation of this single structure and its associated parts later will be described in detail. This lens 45 may be assembled in any desired or conventional manner but I prefer to place it in position by means and according to a method which is novel as far as I am aware. I place the lens 45 between two plastic rings 52 and 53. (See Figure 4.) In assembling the lens I prefer to heat both rings 52 and 53 and place them and the lens there between in position while they are still warm, establishing the position of the lens preferably by conventional photoelectric means. As the rings cool the lens is held firmly in position.

What one might term the static or inoperable portions of the interior of the camera are completed by a simple baffle plate 53' which serves both to exclude light from the film receiving portion of the apparatus and to assist in the support and positioning of the cone and a shutter supporting plate 54. The importance and novelty of this latter plate are later described. This baffle plate may be merely swedged into position against a forwardly facing shoulder 55 formed upon the cone.

A conventional female screw 56 standard in thread is provided in the front support to receive a male screw of the tripod. (Figures 2 and 3.)

It will of course be understood that these three main supports are preferably cast each as one piece. I prefer to make use of plastics but metal may be employed if desired. From the above generalized and specific portions of this description and from a consideration of Figures 4 and 5, and also 15 and 16, it will be evident that the above construction provides the forward support 11 vertical protuberances 64 and 65 and in the rear support 12 similar protuberances 66 and 67 which are in part generally circular in cross section. Such protuberances are useful in furnishing surfaces which can be firmly gripped by the thumbs and fingers of a user and also in providing space wherein may be placed both a delivery spool 68 and a take-up spool 67 for the film f which is being exposed and also storage space for spools 70 and 71 for films which either have already been exposed or are awaiting exposure. These latter films are held into position until wanted by finger pieces 72 and 73 which preferably are cast in the back support 12. As described in connection with Figures 22, 23, and 24 I provide an alternative construction wherein I substitute cells for a flash-gun and flashlight for these space films. Alternatively other supplies or accessories useful to a photographer can be stored therein.

Mounting for film

As will best be understood by reference to Figures 2 and 2a the operative rolls of film 68 and 69 respectively are supported at the top by a flat narrow plate or strip 75 which is pinned at 76 and 77 to cone 13, and of course assembled therewith prior to the positioning of the cone within the front support 11. Each roll may be wound with a conventional light-excluding protective paper P, although it is understood that almost all features of my invention may be applied to a camera of a type which accommodates film, such as that of 35 millimeters in width, which is ordinarily used without a paper backing. For simplicity, I am not showing this paper backing in all views although I am illustrating my invention as applied to a camera of a type which uses rolls of film which are so protected. An appropriate opening in the left end of this strip 75 is formed for the reception of the spindle of spool 68. The winding or take-up mechanism for take-up spool 69 will later be described. The right end of this plate at 78 is bent upwardly and has a squared end for a purpose which will be described in connection with the take-up roll. In order to support these rolls at their lower ends I provide a novel resilient plate 79 which is mounted at its center by a single pin 80 to a boss 81 cast or otherwise formed in the bottom of the supporting cone. This plate is formed with cups 82 and 83 for the reception of the respective spools. The surface forming each of these cups, however, is bent both upwardly as indicated at 84 and 85 and inwardly upon itself at each side as indicated at 86 and 87. See enlarged fragmentary Figure 2a. This formation of the sides of the respective cups therefore is such that tension is applied to the edges of the sides or flanges of the respective spools, this tension being resilient since plate 79 is made of spring metal. As a consequence enough tension is exerted upon the film as it is wound up to keep the film flat at the aperture of the camera.

An alternative construction for mounting and tensioning a spool, shown as a take-up, is illustrated in Figures 4b and 4c. A plate or strip 79', corresponding to plate or strip 79 previously described, is bent downwardly to form a cup 83' generally corresponding to cup 83 but of a critically different shape. The configuration of one side of this cup and the disposition of an opening 99 for the lower spindle of a take-up roll or spool 69' are such that a shoulder 90' engages a flange of the spool but the bottom surfaces of spool and cup clear each other. Thus the spool is kept under resilient retradation. The resilience of the plate 79' forces the upper flange of the spool against plate 75. It will be understood that a similar construction can be employed for the delivery spool.

The take-up

The manner in which the film is wound or taken up will be clear from a consideration of Figures 2, 5, and 6, with particular reference to the last mentioned. As will best be seen in Figure 6 a winding key 91 is attached to a reduced portion of a shaft 93 revoluble within a bearing 94 placed in an upper wall of forward front support 11. This bearing in turn is positioned by another bearing or tube 95 which engages its vertical outer surfaces and is retained by and below an upper horizontal collar 96 formed upon bearing 94 and extending outwardly from it away from the shaft. These bearings are formed with lower collars which respectively engage the inner and outer surface of support 11. It will thus be seen that I furnish a novel structure which can be quickly and cheaply assembled, as will be made more evident as this description proceeds. A tongue connection 97 which is an elongation of the same shaft cooperates with a usual slot in a spindle 98 of taking up roll 69. This one shaft accomplishes a plurality of useful results. It will thus be understood that rotation of button 91 clockwise as shown in Figure 5 will advance the film through the above described construction. A wire spring 99 is wound about a depending flange 100 of ratchet plate 180 which is fixed to shaft 94. This plate is described in connection with the mechanism of which it is a part, this mechanism being that which prevents further rotation of the take-up spool after the film has been completely wound thereupon. The other end of this spring is attached to the bent-up rightward extension 78 of strip 75 previously described. By reason of this arrangement of this spring it will be clear that a photographer may freely wind the take-up roll in a take-up direction, subject to the control mechanism later described, but is prevented from winding the take-up roll in a contrary direction.

To place a fresh film in assembled relation with the camera a user first separates the front and back supports in the manner previously explained and springs down cup 83 by pressing ear 89 thereby freeing the roll in the take-up position which has just been fully wound up. He next places an empty spool in this position. Then he moves ear 88 downwardly and places a spool 68 of unused film in the delivery position. He thereupon unrolls a portion of the black backing paper P and places its end in a slot 99 which is provided in spindle 69. The resilience of the metal of which plate 79 is made serves to hold this fresh spool in the cup. Thereupon he reassembles the camera by merely placing the dove tails together and replacing clips 26 and 27. Or the construction of Figures 4b and 4c may be employed.

Shutter

As will be evident from the previous portion of this description means are provided for resetting the shutter by the film take-up and also for locking the take-up so that after the film has been completely wound thereupon a user will not attempt further winding thereby endeavoring to expose additional photographs with no light sensitive material available and in fact fogging exposures recently made. For convenience therefore I shall now describe the shutter mechanism and parts which are associated therewith since they are operated by an interlock with the take-up which has just been described. Thereafter that interlock will be explained and the lock for the take-up.

As will best be seen by reference to Figure 7 the shutter includes a plate 101 which is mounted for movement upon a pin 102 which is forced within a recess 102' which is turned forwardly in plate 54 and projects into the front wall of the camera. This pin performs other important functions. Brush or switch member 103 is mounted upon the same pin as a pivot. A shutter control lever in the form of a plate 104 is pivoted upon a pin 105 for free movement thereupon. This pin, like 102, has a reduced portion which passes through a bearing 105' turned forwardly in the supporting plate and projecting into an opening preferably cast in the front wall. Its extreme forward portion, or its rightward end as viewed in Figure 8, is peened over at 144 in a manner later described in connection with my masking plate with which it is chiefly associated. A single spring 106 completes the shutter. The shutter plate includes an opening 107 which when aligned with iris 108 exposes the film and an ear 109 which is turned forwardly as viewed in Figure 7 to support one end of the shutter spring 106. The other end of this spring is supported by an ear 110 which is turned forwardly from lever 104. The lower end of this lever below ear 110 also is formed with two oppositely disposed ears 111 and 112 respectively which also are turned forwardly so that they engage the side of spring 106 and upon their movement break the toggle of which it is a part. It should be particularly understood that all of the above described parts (and others later mentioned) are placed upon plate 54 before it is assembled with the front portion 11 of the camera. Thus assembly is cheap and quick. These bearings are made so that they fit closely in the openings formed to receive them thereby positioning the plate within the camera.

As the lower portion of lever 104 by means later described is moved in a clockwise direction as shown in Figure 7 ear 111 engages the side of spring 106 which is thereby moved past its center. This spring is under relatively very slight tension before such movement but this tension is very much increased at the very moment of exposure so that the exposure is quickly made. As the shutter is thus released by the breaking of this toggle its opening 107 quickly moves in a clockwise direction as shown in Figure 7 so that it is momentarily aligned with the iris 108 and the exposure made. The lower end of lever 104 at this instant is moved to the left as shown in Figure 7 thereby leaving the opening 108 in line with the lens and unobstructed. Shutter plate 101 as the exposure is made moves from stop 113 to stop 114, these stops being preferably cast in front support 11. While the shutter is being returned from this last mentioned position to that shown in Figure 7 the iris at all times is completely closed by the opaque body of lever plate 104. Simple mechanism which will later be described gives such movement to this lever that the shutter is thus operated.

Associated with the shutter are the brush 103 for the flash-gun and the means for moving the lens and overcoming parallax. The former is directly operated by the shutter and the latter of course conditions the taking of the picture when the shutter is opened.

This brush or switch disk 103 is also mounted upon pin 102 for rotation relatively thereto. As the shutter is operated in a clockwise direction as viewed in Figure 7 to make an exposure, but not when it is operated in a contrary direction for resetting, this brush is advanced. This movement of the switch disk is always in a clockwise direction as viewed in Figures 7, 13 and 14 because of its ratchet construction which is about to be described.

As is clearly shown in Figure 14, notch 118 cut in the side of the shutter plate 101 makes contact with ears or resilient ratchet teeth 119 bent upwardly from the flat body of brush 103 which is made of resilient metal. These teeth consist of terminal portions bent sharply at a right angle from relatively long tongues cut in the brush plate at its outer edge, the portion of the tongues joining these right angular formations to the body of the disk being bent away from the body at slight angles only. It will thus be seen that as the toggle is broken the brush is quickly advanced by contact between these teeth and the notch. Movement of shutter plate 101 in the contrary direction causes it merely to slide over the tongues without moving the plate. As is seen in Figures 8 and 13 other segments 120 bent downwardly from this brush plate wipe contact points 121 thereby completing the circuit to a flash-gun. As the shutter is reset the brush 103 therefore remains motionless and the circuit to a flash-gun continues open. Otherwise without this feature a user who replaced a flash-bulb prior to resetting the shutter would make electrical contact and waste a bulb.

Control of lens

The lens, with which the above-described shutter cooperates, as previously stated may be mounted in a threaded barrel 49 which as is likewise clearly shown in Figure 7 has an upstanding control arm 50. Preferably the barrel and arm as by casting are formed in one piece. A central control slot 131 receives a pin 132 which is mounted upon a short control arm 133 which in turn is fixed upon pin 105 previously described for movement thereby, upon which for convenience shutter control lever 104 is pivotally movable. A wire spring 134 having in-turned lips 139 is slipped over the upper end of lens control arm 50. These in-turned lips project through appropriate openings formed to receive them and into the outer edges of slot 131 to form a latch. Movement by means later described of pin 132 rocks arm 50 thereby moving the lens along its axis to focus the camera. Such movement also moves pin 132 first downwardly and then upwardly in slot 131. During such movement it separates the ears 139 against the resilience of the spring and moves freely below them until the full rotation of the device, shown as of 180 degrees, has been completed. At this time the pin is again returned to a position within the spring clip. It first separates the lips and then they snap back to hold the pin and consequently the lens in place. It will of course be understood that as arm 50 is rocked first in one direction and then in the other the lens is moved between near and distant positions of focus. Alternative arrangements are shown in Figures 19, 20 and 21 and described in connection therewith.

*Mask for finder*

Simple means are provided to cause such a movement in timed relation to the movement of a mask for the finder which corrects parallax. As will best be seen from Figure 8, a movable front plate 141 is provided with masks 142 and 143 for alternative association with finder lens 32. This plate is fixedly attached at the forward end of shaft 105 being peened over at 144 so that it revolves therewith. Knurled surfaces such as 145 and 146 furnish convenient finger grips. It will thus be seen that as this masking plate 141 is rotated from a far to a near position mask 142 which limits the field of view in a manner which is appropriate for a far position will be removed from cooperative relation with the finder lens having element 32 and positioned in front of the taking lens 45 but without effect thereupon. The opening through each of the masks is sufficiently large that when it is placed before the photographic lens it has no effect thereupon. At this time mask 143 which limits the field of view in a manner which is appropriate for the near position will be placed in cooperative relation with finder lens 32.

Appropriate indicia such as "far" 147 and "near" 148 are placed upon each side of plate 141. Thus when mask 142 is in operative relation with lens 32 the photographer sees the word "far" right side up adjacent this lens but when the position of the mask is reversed and the lens setting is changed accordingly the word "near" or the like appears in this position. Thus the photographer at all time knows, and cannot help but know, that the photographic lens is in a clearly stated position and that the position of the anti-parallax masks corresponds thereto. From Figures 2 and 7 it will be noted that these indicia are clearly visible from both front and rear, Figures 7, 8 and 10 showing the camera in the far position and Figures 9 and 11 in the near.

This plate 141 also and at the same time serves to hold finder lens element 32 in a recess 149 which is formed or preferably cast in the forward face of finder chamber 32. In the assembly operation the lens element is merely dropped into this recess and in the manner elsewhere described that masking plate fixed into position. Thereby the lens element is firmly held in place without the use of a special part, pin or tool.

From the above description it will be understood that the movement of the taking lens 45 between near and far positions is accomplished by eccentric rotation. That is to say the mount which carries this lens is brought forwardly or backwardly by the rotation of its barrel upon a center other than the optical axis of the apparatus. Such an arrangement permits unexpectedly efficient, simple and inexpensive construction together with rigidity and certainty of operation and freedom from wear. It is peculiarly well adapted to apparatus such as that which I have described herein but as is also illustrated in Figure 12 it may be employed entirely independently of my novel and effective masking device. In such instances a lens control structure including an arm 150 corresponds to the structure which includes arm 50 of Figure 7. This structure including this arm in turn in the manner previously described moves a lens not shown corresponding to lens 45. Arm 150 is pivoted upon a pin 151 which corresponds to pin 132 above described. This pin works in a slot, not shown, in arm 150 which corresponds to slot 131 in arm 50 and is fixed to and rotated by a short cross arm 152 which corresponds to arm 133. This arm in turn is fixed to and movable with a control shaft 153 which passes through a front wall 154 of a camera and is operated by a focusing knob 155 and supported by a hub 156. By reason of this construction it will be seen that rotation of knob 155 moves the photographic lens to focus the camera independently of the operation of a masking or other similar device. Conventional detents or a friction grip, not shown, may be employed to hold this mechanism in any position to which it has been moved. The great advantages of this construction have been set out in the introductory portion of this specification.

An important variant of this phase of my invention is described hereinafter in connection with Figures 19, 20 and 21, which include a showing of lens 210, mask 225 and their associated parts.

*Master control lever*

In order to give desired movement to control lever 104 which operates the shutter as previously described an ear 161 is turned therein facing backwardly from the standpoint of a user of the camera as he takes a picture and forwardly as viewed in Figure 7. This ear works within an over-sized space between ears 162 and 163 bent downwardly from the plane of an irregularly shaped master control lever 164 which as best shown in Figures 5 and 15 is pivoted upon pin 165 which for convenience is mounted upon plate 75 and cone 13.

Figure 15:
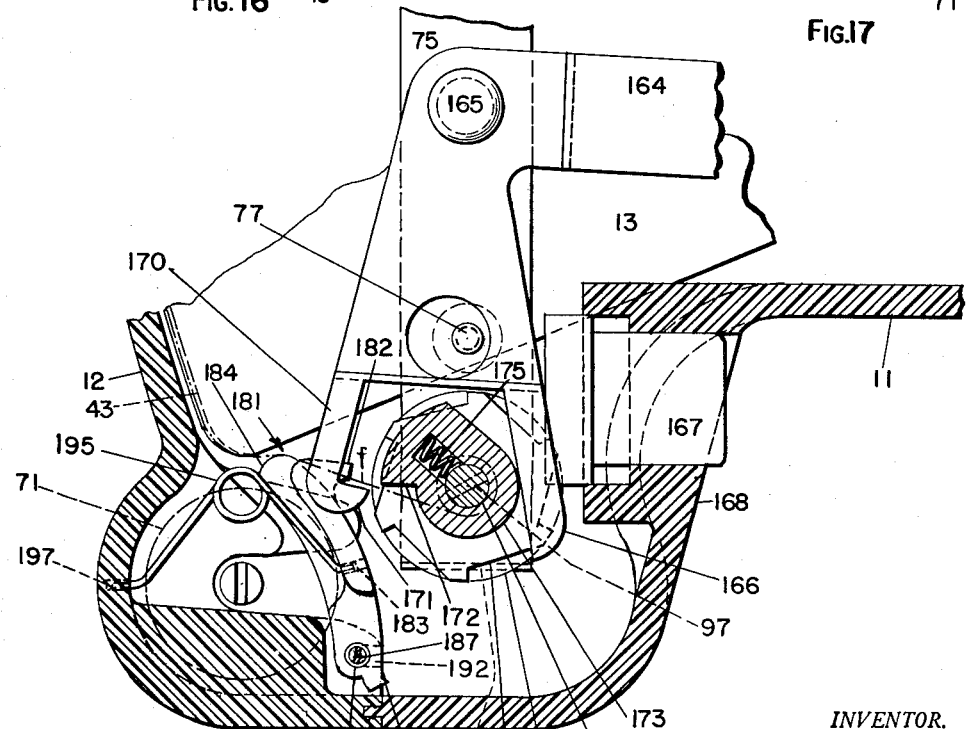
Figure 15 (Sheet 5) is an enlarged fragmentary horizontal section, corresponding in part to the lower portion of Figure 5, showing the take-up and blocking devices, the take-up member being free to move under the influence of the winding key after an exposure has been made.

The rightward and upper end of this lever from the standpoint of a user of the camera or the lower end as shown in Figures 5 and 15 is both bifurcated and bent upwardly away from its body portion toward the top of the camera. A forward leg 166 of the bifurcation is engaged by control button 167 which is mounted in a rectangular opening in a relatively straight boss 168 which extends across the top of the finger holding depression in the right side of the forward wall of the camera. Inward movement of button 167 (or movement leftwardly as viewed in the above figures) rocks this master control lever in a clockwise direction upon pivot 165 and thereby moves shutter control lever 104 so that it engages spring 106 and breaks the toggle of the shutter thereby making the exposure and closing a circuit to a flash-gun. It will be understood that although spring 106 is under slight tension the greater part of the power of this operation is furnished directly by a finger of the photographer.

*Front sub-assembly*

As previously stated, a chief object of this invention is to provide a camera having many novel and desirable features but so designed that it can be manufactured and sold at a price low enough to make it available for the great body of photographers who appreciate a fine instrument but cannot afford one at present prices. One reason why I achieve the result is simplicity and quickness of assembly with consequent saving in cost. For example, I first assemble all of the parts for the shutter and flash-gun switch on front mounting plate 54, including pin 102 and shaft 105. Then this sub-assembly is placed in the front support 11, pin 132 and shaft 105 passing within the front wall. These bearings position the plate upon the front wall. Thus pin 132 and ear 161 project backwardly toward the rear of the camera. Control lever 164, the lens in its carriage and including arm 50 with slot 131, and baffle 53' already have been assembled with the cone. A worker places the cone in position and inserts rivets 40 and 41 which also support springs 44 and 44'. As a result of this operation and nothing more the lens and shutter mechanisms are completely assembled. Slot 131 of the lens structure carried by the cone engages pin 132 facing backwardly from the front support and ears 162 and 163 which face forwardly embrace ear 164 which faces backwardly. Thus the actuating members of the controlling mechanism for the shutter and lens and the actuated members of the controlled mechanism of the shutter and lens are instantly placed in operative connection merely by this act of assembly and without the use of a jig or fixture or rivet, pin or screw.

It will have been understood from the previous portion of this specification that at the time that the cone 13 is placed within the forward support 11 all of the parts carried by the cone additional to those just mentioned have been assembled with it, notably the plate 75 which is positioned upon the top and the plate 79 upon the bottom. Explanation of the simple assembly of the parts associated with the winding key will be presented after all of those parts and their operation have been explained.

Operation of control members

The simple mechanism which operates the above described control members and resets the shutter will now be described.

Left fork 170 (as viewed in Figures 5 and 15) of control lever 164 terminates in a pawl 171 which engages a ratchet 172 which is cut on the periphery of a control cam 173 which is frictionally mounted for movement with and relatively to shaft 93. A compression spring 175 placed within an appropriate opening in this cam and bearing against the shaft makes it possible for revolution of the shaft to move the cam so that its ratchet engages the pawl but permits further movement of the shaft thereafter. When button 167 is moved inwardly toward the camera or backwardly to make an exposure or to the left as viewed in Figures 5 and 15, the pawl and ratchet are separated and shaft 93 left wholly free to move in a winding-up direction—counter-clockwise as viewed in these figures. Figure 15 shows such movement as having been made. Further movement of this cam, however, brings it into contact with right leg 166 of the control lever and thereby resets the shutter by moving the control lever back from the position of Figure 15 into that shown in Figure 5. Still further rotation brings pawl 171 into contact with ratchet tooth 172 as shown in Figure 5. Since a single rotation is not enough to advance a sufficient length of film into picture taking position the user continues to rotate the button 91 against the relatively slight power of spring 175 until the next number upon the paper P appears at window 35.

It will therefore be understood that Figure 5 shows this mechanism after one exposure has been made and the film wound into position for taking the next exposure while Figure 15 shows these parts in the position which they assume after an exposure has been made by movement of button 167 but before knob 91 has been rotated to bring a fresh film into picture-taking position. An exposure can be made when the parts are in the position of Figure 5 but no exposure can be made when the parts are in position as shown in Figure 15.

As previously pointed out this simple arrangement makes it possible for me to dispense with elaborate mechanisms, such as have been previously proposed, to compensate for the increase in the diameter of the take-up roll as the film builds up but to retain the practical advantages of such complicated mechanisms.

Preventing of double exposure

As is best shown in Figures 15, 16, 17 and 18 simple means for preventing an attempt to take a picture after the film has been exhausted are also associated with take-up shaft 93. A second ratchet plate 180 associated with this take-up shaft is fixed for revolution therewith. An irregularly formed multi-purposed master stop plate generally indicated as 181 controls this operation. It is formed with a control tooth 182 which projects forwardly or rightwardly as shown in the figures, a spring receiving opening 183, a film or paper-engaging surface 184, an oversized pintle-receiving opening 185 and a stop-protuberance 186. Thus the single plate through which this entire operation is controlled may be formed in one stamping operation.

As best shown in Figure 18 this plate is mounted in a novel and effective fashion. A novel spring pintle in the form of a light round spring 187 is placed in the opening 185 with its upper and lower ends protruding beyond the plate. Supporting bosses 189 and 190 project toward the interior of the camera from casing 12, preferably having been cast therein, and are so spaced as to clear the edges of master plate 181. Parallel slots 191 and 192 of a size to receive the ends of spring pintle 187 are cut in opposite surfaces of these bosses in alignment with each other. The plate with the spring pintle in position is merely moved toward the back wall of the exterior casing 12 with the ends of the spring pintle in engagement with the slots. The length of the pintle is slightly greater than the distance between the bottom surfaces of the two slots which receive it. The spring is therefore bowed slightly and its tension is enough to hold the pintle in place. Thus I assemble a pivoted member in my apparatus in what is literally an instant of time and without the use of a tool or fastening device, the resilience of the pintle itself being sufficient to hold it and the master stop plate in position.

Figure 16:
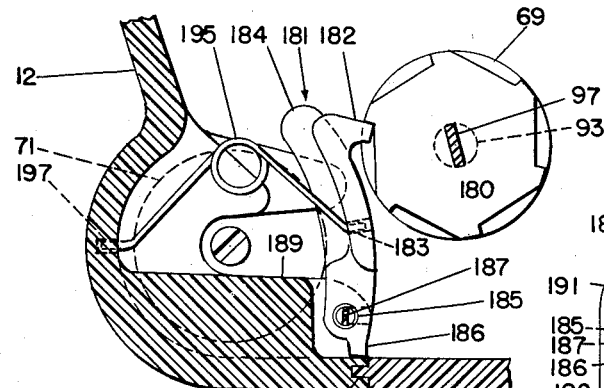
Figure 16 is a detailed horizontal section which corresponds to a portion of Figure 15 but shows the take-up and shutter blocked as when the film has been completely wound up and is ready for another exposure.
Figure 17:
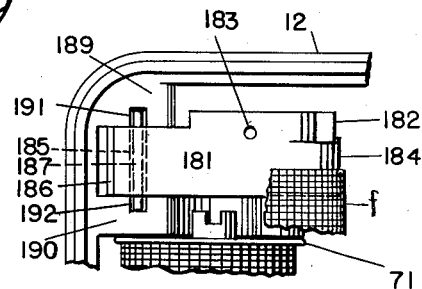
Figure 17 is an enlarged fragmentary side view partially broken away showing my blocking device in free or film-running position before the movement of the take-up has been arrested by the exhaustion of the film.

A wire spring 195 coiled as seen in Figures 15 and 16 extends from an appropriate opening 197 in the back support to the opening 183 in the master stop plate thereby tending to move this plate in a clockwise direction as seen in the figures and to hold the surface 184 in engagement with the paper or film as it is fed.

The operation of this feature of my device will be clear from the foregoing description and from a consideration of the figures. As a user separates back support or cover 12 and front support 11 in order to take out a used film and place a fresh film in position the above described device is of course borne away from the body of the camera with support 12 since it is mounted upon it. Engagement of stop 186 of the master plate with an adjacent portion of the body of the cover limits its clockwise movement as seen in the drawings. After a fresh film has been placed in position the cover member 12 is reassembled with the remainder of the camera. The operation brings surface 184 of the master plate against the paper or the film as the case may be and moves master plate counter-clockwise to the position shown in Figure 15. As the film is fed this surface bears against the paper, or against the film in case no backing is employed as in the camera of the so called miniature type. After the film is exhausted the power of the spring 195 moves the tooth 182 into position to engage a tooth of ratchet 180 as it is revolved by movement of shaft 93. If thereafter the user attempts to rotate take-up knob 91 he finds it blocked.

*Blocking of take-up when film exhausted*

It will thus be seen that I not only practically speaking remove the danger of double exposure in the manner previously described but also block the take-up after the last exposure has been made upon a given film. Since the shutter can be reset only by the take-up when the take-up can no longer be operated the shutter cannot be reset and the photographer cannot attempt to make further exposures with no film in position opposite the lens. When a photographer feels that the winding key is blocked he knows he must supply fresh film.

*Assembly of camera*

Having now described the various elements and combinations which are associated with the takeup spindle I can explain the simple manner in which they are assembled therewith. In common with other phases of my invention this portion thereof is characterized by multiple use of single parts. Also, the assembly is quick and cheap and does not require the use of a single rivet or screw or special tool, jig or fixture. Preferably but not necessarily, certain of these parts are first assembled with the front support 11 of the camera, others are placed in position on the cone, and the cone placed within the support and pinned into position as previously described.

According to any method of assembly, control lever 164 and strip 75 are mounted by a common pin 165 upon the upper portion of the internal support or cone 13. That is all, so far as the cone is concerned. Bearing or tube 94 is inserted in its appropriate opening in the upper wall of support 11 and tube or bearing 95 placed over tube 94. Next the upper shoulder 96 of tube 94 is crimped over thus holding both in place relatively to each other and to the support. Then shaft 92 is inserted in the inner bearing and control button 91 slipped over its top which is then peened over to hold button and shaft in position. Thereupon cam 173 with spring 175 in place is slipped upon the lower extended portion of shaft 93, the spring serving to hold the cam in position. I then force ratchet 180 upon the depending tongue 97 of this take-up shaft, wire 99 having been previously placed about the depending shoulder 100 of this ratchet. Thus this ratchet holds in place all of the previously recited parts which are associated with the take-up. Then a worker places the cone within the front support rocking it slightly so that the bifurcated end of control lever 164 clears the take-up shaft. Thereupon as previously stated, the case is riveted to the front support, this act of assembly having also joined the controlled and controlling members of the lens and shutter mechanisms as explained hereinabove. The free end of wire 99 is inserted in the turned up edge 180 of strip 75, this insertion being the only permanent physical connection between any of the parts associated with the take-up and those mounted upon the cone. Master control plate 181 which coacts with this ratchet is independently assembled with rear support 12. Alternatively the cone with the strip 75 and lever 164 previously fastened thereto may first be fastened into position within the front support and the various parts placed upon the take-up shaft by insertion through the open end of the control lever, the resilience of strip 75 being sufficient so that it can be sprung out of the way. It will thus be seen that my arrangement of operable parts not only results in lessened cost of production and increased efficiency and certainty of operation but also ease and cheapness of assembly.

*Mounting of lens*

As previously stated in connection with the description of the lens 45 and its mounting and as is clearly shown in Figure 4a, I may prefer to apply other novel means and methods to a photographic lens and its mounting in the camera.

If I employ a plastic lens which is manufactured in accordance with my co-pending application Serial Number 629,018, filed November 16, 1945, I may form lens 199 integral with a supporting and protective annular rim 200. This annulus is placed in a cylindrical mount 201, also of a synthetic resin, with an external thread 203 which cooperates with an internal thread 204 cut in a cone 205 which corresponds to cone 13 previously described. Mount 201 may be formed with or attached to a control formation such as previously described.

I first assemble this lens with its mount. By photoelectric or other conventional means I determine the exact position of lens 199 along the longitudinal axis of the camera in accordance with the optical characteristics of the particular lens. It is of course understood that in spite of modern manufacturing excellence each conventional lens must be placed separately in correct position relatively to the film in accordance with its own peculiar characteristics. This method is alternative to that previously described involving the heating of separate rings 52 and 53. If desired, such a plastic lens with an annulus may be placed in position by the use of two heated plastic rings as previously described or otherwise. As stated and claimed in said co-pending application I am able to avoid this necessity in such cases as I form my unique plastic lens with a stop or other formation which accurately determines its position along the longitudinal axis.

*Overcoming parallax; alternate lens adjustment*

As previously stated in an important variant of my invention the photographic lens may be placed in more than two positions and at the same time provision automatically made to overcome parallax. This form of my invention is shown in Figures 19 to 21.

A lens 210 is mounted in a threaded barrel 211 with which there is formed or to which there is attached an upstanding control arm 212. The lens mount may be closely similar to that previously described and shown in Figure 7 and those associated therewith. A central control slot 213 in this arm receives a pin 214 which is mounted in a short control arm 215 which is fixed upon pin 216 upon which is pivoted a shutter control lever 217 which corresponds to lever 104 previously described. The formation and control of this control lever and the parts associated therewith may be as previously described. A round spring 219 is formed with two inturned lips 220 and 221 respectively which extend through appropriate openings in the side of the arm and into the central control slot but at vertically spaced points.

For convenience, I am describing this embodiment of my invention as having three positions—a first, where the instrument is focused for infinity, this position being characterized as "far," a third or "close-up" or "near" position, and a second or intermediate position disposed between the first and third, this position being characterized for purposes of illustration only as from 6 to 12 feet.

In the position shown in Figure 19 the lens is latched in the far position by engagement of pin 214 by internal ear 220. As arm 215 is rotated clockwise by a mechanism which will later be described pin 214 moves downwardly in slot 213. During the first portion of such continuing movement it engages ear 220 and moves it to the left as shown in this figure. Further movement after control plate 215 has been rocked almost 90 degrees causes it to move ear 221 to the right, likewise as shown in this figure. At this point it will be understood that arm 212 is perpendicular and shaft 214 by coaction with the lower portion of ear 221 is latched at the bottom of slot 213. This represents the second or intermediate position of focus of the instrument. Further movement of control arm 215 in a clockwise direction as viewed in Figure 19 will still further rock the upper portion of arm 212 until arm 215 extends horizontally to the left. Such movement first causes pin 214 to move ear 221 to the right thereby unlatching the lens from the second position. As continued movement of the short arm causes it to approach a horizontal position shaft 214 moves ear 220 to the left. Thereafter ear 220 latches the lens in the third or near position with the pin at the top of the slot. It will be understood that this spring is relatively light so as not to hamper movement of the lens between the three positions although of sufficient magnitude to hold the mechanism in any one of the three positions once it has been moved there. One advantage of this arrangement other than its simplicity and ease and cheapness of manufacture and assembly is that all three positions are definite and a user by feeling or sound is conscious of the position of the lens in any one of the three positions. He is thus enabled to focus his instrument without looking at a dial or calibrations. Any reasonable number of positions may be added, additional latches being provided or a friction detent being substituted.

Turret or mask control lens

The above described movement is communicated to the lens through short arm 215 by a mask or turret 225 which is attached at the end of shaft 216. Thus it will be understood that movement of this turret is effective to move the lens between the three positions which have been indicated above.

This turret also cooperates with a finder lens system a forward element only being shown, mounted as previously described. Masks for this lens are carried by or formed integrally with the turret. Each limits the field of the finder lens to an extent appropriate to the particular setting of the photographic lens then in effect and thereby corrects parallax. In fact in its simple form this turret may be nothing more than a flat plate with four openings, as shown for illustration herein. These four openings 235 to 238 both inclusive which are employed to correct parallax are preferably of the same size but differently spaced from the axis of the plate. In the position as shown, this position being the one which has been previously characterized as the first or far, opening 235 is associated with finder lens 231 and opening 237 is opposite iris 240 which is aligned with the photographic lens 210. It will of course be understood that mask 237 has no effect upon the photographic lens but that mask 235 limits the field of the finder lens to that which is appropriate for the far position of the photographic lens. As the user rotates this masking plate in a clockwise direction as for example by grasping an outwardly extending knurled annulus 242 he brings mask 236 into the second position opposite lens element 231 and mask 238 into position opposite iris 240. At this time it will be understood that control shaft 212 is vertical and the lens in the second or middle position above mentioned. The distance of opening 236 from the center is such as is appropriate to this intermediate position. Further rotation of the disk advances mask 237 to cooperative relation with lens element 231 and places mask 235 opposite iris 240. The parts are now in the third or close-up position above mentioned. This mask 237 is appropriate for the near or close-up position to which the photographic lens has now been advanced. Opening 238 has no function except to furnish a clear space opposite the iris for use in the intermediate position.

Parallax

The principles which are involved in the above device will be briefly reviewed. When both the camera lens and the finder lens are directed upon a given object the longitudinal axes of the two lenses coincide at the object thereby when considered to be joined by a base line forming the sides of a triangle, with the object at the apex and the altitude a line joining the object and the base. If the camera is moved toward or away from the object the altitude is changed and the sides, which are the longitudinal axes of the two lenses, must be correspondingly shifted if they are still to coincide upon the object. By reason of the above laws in fact or in effect the longitudinal axis of the camera lens and that of the finder lens system must be relatively moved toward each other as the camera comes nearer the object to be photographed and away from each other as the camera is disposed more distantly from the object so that at all times this object is located at the apex of the triangle. Thus parallax is overcome. As a practical matter, it is the finder lens system which controls. A photographer moves his camera up or down until he includes within the field of the finder the object which he wishes to photograph. The axis of the photographic lens follows; only if it intersects the object at which the finder is aimed does the photographer secure the picture which he desires. Therefore for satisfactory results the two axes must intersect at the object. Instead of actually physically shifting one or both lenses in order to accomplish the above result it has been found equally effective to change the upper and lower boundaries of the field of the finder and then bodily to move the camera.

In my camera I prefer to make this change by rotation of masks as described above. These masks therefore are so designed that they limit the field of view of the finder in accordance with the field which is covered at the various automatically corresponding adjustments of the photographic lens and make certain that the object which the user sees in the center of the finder is that which will appear at substantially the same place in the photographic lens and hence in the photograph. Thus when a "close-up" is to be taken of a near-by object I provide a mask which cuts off the foreground and extends the background thereby forcing a user to lower his camera in order to direct his vision at an object which is positioned within the field of the photographic lens when the instrument is focused for such a near-by object. When on the other hand he wishes to take far view a mask operatively interconnected with the lens is placed in position of such shape that he can see relatively more of the foreground and less of the background with the camera held in the same position as before. Hence to cover a wanted distant scene with the photographic lens he is forced to tilt the front of the camera upwardly thereby making the line of sight from his own eye and that from the photographic lens as the instrument is then focused converge upon the distant object. Other masks similarly controlled in accordance with the movement of the lens operate similarly.

*Battery for flash-gun within camera*

As has been stated in the introductory portion of this specification I may employ my novel camera with novel or conventional flash-guns. The battery may be mounted within the camera or within the flash-gun, whether the flash-gun be novel or conventional.

In either case, however, I provide novel means within the camera for controlling the operation of the flash-gun and a plurality of novel means which are selectively available for electrically connecting my camera and my novel or any conventional flash-gun.

As will be observed from a consideration of Figures 1, 22 and 26 I may prefer to make available for a photographer's simultaneous use a plurality of flash-guns all of which are controlled by my camera. Under many conditions a photographer wishes to use at one time more than one source of artificial illumination. While he may care to illuminate a face for example by a flash-gun which he holds in his hand so that he can direct it instantly and at will he may also desire additional artificial illumination, as for example, to destroy unwanted shadows or furnish back lighting or emphasize or "model" a particular portion of a scene which he is photographing. To this end I prefer to make the connectors which are attachable to my flash-guns of such nature that additional plugs as desired may be inserted therein, cords connected with these plugs being effective to operate other flash-guns, all, however, under the control of the camera.

In one general arrangement of means for artificially illuminating a picture to be taken by my camera I place cells for a flash-gun within the space previously described which is otherwise available for the carrying of spare or exposed rolls of films. See Figures 22, 23 and 24 upon Sheet 3. When desired these cells are slipped into the receptacles otherwise supporting extra or used films. When they are not needed they may be taken out and films stored in the camera in their place. Thus one set of devices accomplish a plurality of results. The instrumentalities which hold the cells or film rolls in place have sufficient resilience to accommodate substantial differences in height. In other preferred arrangements I house the battery within a flash-gun.

As best shown in Figures 22, 23 and 24 upon Sheet 3 I may place cells B and BB within the space formed by the rearward protuberances 66 and 67. Alternatively this space is available for the storage of rolls 70 or 71 of films, fresh or exposed. The bottom of each cell or each roll is supported jointly by shoulders 320 and 321 which preferably are cast into cover 12' of the camera and by resilient metallic contact fingers 322 and 323. These shoulders have central openings to receive the protruding spindles of film rolls. Resilient metallic fingers or brackets 326 and 327 engage the upper portion of each cell or of each roll. A cross lead 329 connects contact finger 323 associated with the bottom of this rightward cell and bracket 327 associated with the top of the leftward cell. A leftward female contact element 330 is connected with contact spring 322. The rightward contact spring and a female contact element 331 disposed upon casing 12' adjacent the point at which it engages casing 11 also are electrically connected. Male contact elements 332 and 333 cooperatingly disposed in relation to the female elements just described are mounted upon the camera housing 11 so that when the two housings are brought together the elements will unite and complete a circuit.

A lead 334 extends from contact element 332 to jack 339. Male element 333 is connected by lead 335 to contact point 336 which together with contact 337 are engaged by brush 103' corresponding to 103 previously described. Contact point 337 is connected to jack 339. A by-passing lead 338 directly joins lead 335 to one of the connectors of jack 339 and contact point 337 is directly joined to another connector of this jack. A plug 340 may be inserted in this jack and by a three wire circuit generally indicated as 342 is attached to a connector generally indicated as 343. One lead 345 is common and does not pass through the switch and the by-pass of the camera. A second lead 346 is connected through the switch and a third lead 347 is connected by way of the by-pass. Upon the other side of the plug 343 lead 346 is extended to feed flash bulb 350 and lead 347 is extended to one side of flashlight 352. An extension of common lead 345 furnishes the return of the circuit of the flash bulb and is connected through a switch 354 to a short lead 355 which completes the circuit of the flashlight.

By reason of this construction it will be evident that when cells B and BB are placed in position they will be in series and connected to the female members of the contacts carried by the cover or back separable casing of the camera. When the cover member is placed upon the body member the battery will be in circuit with the switch 103' of the camera and through it to the flash-gun when the plug 340 is duly inserted. It will be understood that as an exposure is made the circuit comprising leads 345 and 346 is closed and flashes bulb 350. Alternatively when switch 354 is closed a circuit comprising leads 345 and 347 is made independently of the automatic camera-controlled switch 103'. The novelty, convenience and efficiency of this arrangement will be obvious to those skilled in this art.

*Battery within flash-gun*

As previously stated one object of my invention is to provide apparatus both for photography and artificial illumination thereof which is versatile and adapted to changing needs and resources of a photographer. It may be practiced by units which may be purchased separately at the same or different times and combined and recombined from time to time as the needs of a photographer and his financial resources may dictate. For such reasons and as will be best understood by reference to Figures 1, 8 and 25 (Sheet 7) under many conditions my novel camera and my novel flash-gun may well be combined. In this case within a housing 360 within my novel flash-gun 9 I place cells 361 and 362. A flash bulb 363 is set in a reflector 364 which is also attached to this housing and extends forwardly therefrom. A hook 365 is provided by which the flash-gun can be attached to any convenient support in those cases in which a photographer does not wish to hold it in his hand.

A circuit 366 (Figure 25) extends from a plug 367 which is detachably connectible to the flash-gun. This plug embodies a jack by which additional flash-guns made be fed but also under the control of the camera. A branch circuit including a lead 368 controlled by a switch 369 feeds a flashlight 370. This switch is so placed upon the rear of the flash-gun that it can be readily operated by a free finger of the left hand of a photographer as he holds the flash-gun. Cord 10 carrying circuit 366 leads to a plug 371 detachably connectible with the camera.

Connection of flash-gun and camera

Preferred means for electrically connecting the flash-gun to my camera for operation thereby will be clear from a consideration of Figure 8 (Sheet 4). Plug 371 includes housing 372 which supports prongs 373 and 374 which through appropriate openings engage conducting spring plates 375 and 376. These plates are supported within a housing 377 which can be formed as a part of the camera or be fixedly attached to front support 11. Contact elements 121 previously described are supported by or may be formed integrally with these resilient contact plates. By reason of this construction it will be evident that a user merely plugs the prongs into engagement with contacts 375 and 376 and flash-gun 9 is ready for operation simultaneously with the operation of the shutter 101 of my camera 8 under the control of button 167.

Plurality of flash-guns operated by one camera

A preferred arrangement by which I operate additional flash-guns under the control of one camera will be clear from Figures 1 and 25 (Sheet 7). Plug 367 attachable to flashlight 9 is so constructed that a plug 382 may be inserted therein. (For a similar construction by which this result may be obtained see Figure 22.) This plug 382 is connected to a cord 383 having a circuit including a lead 384 and is joined to a plug 385 which feeds flash-gun 9' and in turn is so designed that an additional flash-gun may be plugged therein. It will be understood that any reasonable number of flash-guns may be so added to the original circuit which is controlled by the switch carried by the camera.

Alternatively and as shown in Figure 26 (Sheet 7) I may make use of a conventional flash-gun which carries its own battery. In this instance contact elements 121' are attached to prongs 390 which project forwardly or to the right as viewed in Figure 26 from the body of the camera. A jack 391 attached to a circuit 392 operates a conventional flash lamp 393 which is fed by its own battery 394 which is housed in the structure of the flash-gun.

Connectors for flash-gun

Whether the camera carries a battery for use with a flash-gun without a battery or the battery is within the flash-gun, the flash-gun is controlled by the camera. It will therefore be understood that the electrical connectors between the gun and the camera preferably must be so arranged that the current may safely flow in either direction. I therefore provide male connecting elements which project from the front face of the camera together with simple means for protecting them against the danger of accidental short circuit when they are "hot." Although ordinarily the electrical energy which is available from the cells is not sufficient to cause bodily injury to a normal person there is always danger of an accidental short circuit which will exhaust the cells.

One simple device to accomplish the ends indicated above is illustrated in Figure 27 (Sheet 7).

I may if desired provide a simple movable housing 401, or cap, preferably cast in a plastic, which protects the projecting elements 402 of a connector attached to contacts 121' when a flash-gun is not to be employed. The housing includes a central opening 404 with closed sides which is adapted completely to surround contacts 402. It is mounted upon a movable pin 406 which passes through an appropriate opening in the front wall of my camera and has a head 407 disposed within the body of a camera. A coiled spring 408 is placed between the head and a front wall 409 of a front camera support 11'. This spring normally moves the housing toward the camera and holds it there.

When a flash-gun is to be used a photographer grasps housing 401 and moves it forwardly upon its pin and away from the body of the camera thereby compressing the spring. He then rotates the housing upon this pin to the position shown in dot and dash lines in Figure 27 and permits the spring 408 to move it backwardly into contact with the outer and lower portion of the front wall of the camera. This arrangement is much superior to one which includes a loose part which might be lost. When the flash-gun is no longer to be used, its plug is removed and cover 401 is moved forwardly away from the camera body and rotated upwardly and allowed to spring back to cover the forwardly projecting connectors.

A simplified device for accomplishing a similar end is illustrated by Figure 28. In this case I provide a plug 411 connected to a flash-gun not shown and having spring prongs 412 extending therefrom for cooperation with projecting connecting pins 413 mounted in and extending through and forwardly from a wall 414 of a camera structure 11''. The inner ends of these pins are so dimensioned and disposed that they may be engaged by a switch element such as 103 previously described. To protect these connectors from an accidental short they are surrounded by an annulus 415 which is preferably cast as a part of wall 414. The sides or wall of this annulus extend outwardly from the body of the camera a distance greater than the length of the forwardly projecting portion of prongs 413 and consequently protect them from a short circuit. As a consequence if a user places the camera face downwardly for example upon a metal surface this forwardly projecting wall will prevent short circuit. Indeed the only likely way in which a short circuit could be caused would be deliberately.

According to another variant of this invention the simple connecting mechanism of Figure 29 may be used.

A plug generally indicated as 421 attached to a cord 422 supports connectors 424 which are of such length that they readily pass through appropriate openings in a front wall 425 of a front support 11''' of a camera and into a position wherein they are directly engageable by a brush or switch plate 425 corresponding to brush plate 103 previously described and shown on sheet four of the drawings. Thus as plate 425 is revolved in synchronism with the opening of the shutter a circuit which includes the cord 422 is made and a flash-gun not shown is operated. It will be noted that when the plug is removed no element is engageable by the revolving switch plate thus saving wear and power. In my camera as designed no light can leak through these openings to fog the films but when this embodiment of this phase of my invention is used in structures with different arrangement of internal parts appropriate baffle plates may be used.

*Battery within camera or flash-gun*

An important embodiment of this phase of my invention includes novel connecting devices which are particularly adapted for use with my camera which is supplied with space for batteries and with a flash-gun which does not include a battery or alternatively with one which does include a battery. This arrangement includes a connector which when placed in operative relation to a camera in one position operates a flash-gun from a battery of a camera and when placed in such relation in another position operates a flash-gun from its own battery, such changed position making all adjustments which are necessary.

As is clearly shown in Figures 30 to 35 both inclusive (Sheet 7) I may supply such a special duplex connector generally indicated as 441 for cooperation with four connecting prongs which extend forwardly through and beyond wall 442 of a camera similar to those previously described. Two of these prongs 445 and 444 correspond to prongs 121 previously described and are controlled as by a switch disk or brush 103'', which is operated in the manner previously described in connection with brush 103. Two additional prongs 445 and 446 also project forwardly from this front wall. Leads 447 and 448 extend to connectors 449 and 450 placed upon the body of the camera which are engageable by female connectors 451 and 452 placed upon the cover. Leads 453 and 454 join these latter connectors respectively to a battery 455 carried by the camera. By reason of this construction it will be evident that when a user, after he has taken out a used film and substituted a fresh film, replaces the cover the circuit including the battery and switch within the camera will have been reconstructed, all in the manner previously described in connection with Figures 22, 23 and 24.

An annulus 456 projecting forwardly from wall 442 protects these prongs and engages plug 441. Latching means, not shown, hold plug 441 and annulus 456 together after they have been so placed. A shorting element 457, the purpose of which will later be apparent, preferably in the form of a small metallic plate is carried forwardly of the front wall of the camera upon a small support 458 shown as a shoulder which is preferably cast with wall 442 or if desired may be in the form of a separate mounting which is attached to the front thereof.

Two wires 461 and 462 from a flash-gun enter plug 441 and are continued therewithin as wires 463 and 464 respectively which are attached respectively to spring connectors 465 and 466 which are so disposed that whenever the plug is placed in cooperative relation with the camera they engage prongs 443 and 446 whether the plug is placed in the position of Figures 30, 31 and 34 or in that of Figures 32 and 35, the former position for convenience being designated "battery in camera" and the latter "battery in gun." In the former case contact 465 and hence wire 461 are electrically connected to prong 443 and contact 466 and hence wire 462 are connected to prong 446. In the latter case the condition is reversed. It will be understood that when the connector is in the position "battery in gun" there are and must be no batteries in the camera and the flash-gun and flashlight if one is employed are fed from the battery within the gun. Similarly when the connector is in the "battery in camera" position the current is supplied from the cells within the camera only.

A cross connecting plate 471 is mounted upon an insulated post 472 within the plug. This plate is so disposed that no matter which end of the plug is placed upwardly one end or the other of this plate operatively engages post 444 which is engageable by the switch. When the plug is disposed in the "battery in gun" position of Figures 32 and 35 this cross connecting plate 471 engages shorting plate 457 as well as post 444 and hence joints the switch to the flash-gun since it bypasses the leads for the battery within the camera but when it is in the "battery in camera" position of Figures 30, 31 and 34 it engages post 445 as well as post 444 but does not engage the shorting plate and hence is in circuit with the battery which is disposed within the camera. When the plug is in this position therefore the shorting plate 457 is inoperative. It will always be understood that when a flash-gun carries its own battery none is placed in the camera.

Under certain conditions it may be desirable to supply an intermediate conventional connector generally indicated as 481 so that my novel connector 441 may be attached to the connector and cord supplied with a flash-gun of either of the types just described. One such flash-gun without a battery is shown in Figure 34 as having a flash bulb 484 fed directly by a circuit having leads 485 and 486, which are supplied by battery 455 in the camera. Another flash-gun carrying its own battery 488 is shown in Figure 35 as having a flash bulb 489 fed on one side by a lead 491 and on the other by leads 492 and 493 with the battery 488 between them. So that the flash-gun of Figure 35 may if desired be used without its own battery and current supplied from one which is disposed within the camera I may supply a by-pass 494 having a switch 495, this switch of course not being closed except when the battery is removed from the flash-gun and current supplied from the camera. I may add a device which makes it impossible for this switch to be closed except when the battery is removed from the flash-gun or alternatively I may dispense with the switch and supply means which automatically connect leads 492 and 493 when all cells are removed.

I supply means whereby a user may be certain in which position he has placed the plug. Above the annulus 456 on the front wall of the camera I place indicia, one above the other, such as "Battery in gun" and "Battery in camera" as clearly shown in Figures 32 and 31. In these figures "Battery in camera" is shown as directly below "Battery in gun." The plug 441 may be made with two skirts. One of these skirts 498 is opaque and is disposed at the top of the plug when it is attached to the camera in the "Battery in gun" position and of course at the bottom when the plug is attached in the "Battery in camera" position. The width of this skirt is such that when the camera is in the "Battery in gun" position it covers the legend "Battery in camera" but permits "Battery in gun" to be seen. At the opposite end of the plug a second skirt 499 is formed with a window 500 between an opaque portion 501 and the body of the plug. When the plug is attached to the camera in the "Battery in camera" position those words are visible through the window 500 while the opaque panel 501 covers the words "Battery in gun." It will be understood that when the plug is so disposed on the camera that one skirt is in upper or operative position the other skirt is in lower position and out of the way. Thus it will be seen that by such means parts upon plug and camera cooperate to indicate the working condition of the device. Other arrangements of indicia may be used.

By reason of this construction it will be evident by observation of Figures 30, 31 and 34 that whenever plug 441 is in the position shown in those figures the flash bulb 484 will be fed by battery 455 carried within the camera and controlled by brush 103". This circuit will be from the battery 455 through lead 453, connector 451—449, lead 447, post 445, cross connecting plate 471, post 444, switch plate 103", post 443, spring contact 465, lead 463, wire 461, connector 481 (if desired), lead 485, flash bulb 484, lead 486, connector 481 (if used), wire 462, lead 464, spring contact 466, post 446, lead 448, connector 450—452, lead 454, and back to the battery 455.

If a user wishes to employ a flash-gun such as that of Figure 35 which carries its own battery he places no battery within the camera, the previous circuit to that battery which includes leads 445 and 446 then being dead because no battery is in position. Under these circumstances he merely turns plug 441 over so to speak from the position of Figures 30 and 31 to that of Figure 32. Under these conditions it will be seen that the shorting plate 457 carried by the camera and extending forwardly therefrom makes a connection between cross connecting plate 471 and wire 461 through spring contact 465 and lead 463 thereby by-passing the presently dead circuit previously including the battery 455 within the camera, this battery now having been removed from the camera. Under these conditions the circuit which is employed is from battery 488 through lead 493, connector 481 (if employed), lead 461, lead 463, spring contact 465, shorting plate 457, cross connector 471, post 444, switching plate 103", post 443, spring contact 466, lead 464, lead 462, connector 481 (if used), lead 491, flash bulb 489, and lead 492 back to battery 488.

*Advantages of invention*

The advantages of my invention will have been made apparent from the foregoing portion of this specification, the attached drawings and the subjoined claims. They include the provision of a camera which is simple and inexpensive to manufacture and easy to use, particularly in that if desired it may be firmly grasped by one hand in picture taking position while a photographer through a finder watches the scene he is about to photograph and holds a flash-gun in his other hand. Other advantages include arrangements, devices and methods which make the construction and assembly of a camera much cheaper and quicker than previously known, so far as I am aware, while retaining safeguards and conveniences which are novel and improved which accomplish results previously not found except in much more expensive instruments. Among important advantages are improved control and electrical devices both of a camera alone and in combination with a flash-gun or with a flashlight or a plurality of each thereof.

I claim:

1. In a camera, an enclosing casing, an internal support in the form of a single unitary and integral frustum, said casing having an opening in its front wall, a shutter for successively obscuring said opening and admitting light therethrough mounted upon said casing in alignment with said opening, an operating member having a motion-receiving formation extending therefrom and operatively connected to said shutter, a shutter control lever mounted upon said inner support for pivotal movement thereupon, one end of said control lever relatively adjacent said operating plate having a motion transmitting formation so disposed and formed that when said inner support is positioned within said enclosing casing said formation engages said motion receiving formation of said operating member whereby said operating member can be moved and hence the shutter operated by the pivotal movement of said shutter lever, a photographic lens mounted within the smaller base of said frustum of said inner support in alignment with said openings, a support for a delivery spool and a take-up spool of film mounted upon said inner support adjacent the rearward end thereof, a take-up button for rotating said take-up spool of film, said button being disposed upon the exterior of said casing, an exposure button disposed upon the exterior of said enclosing casing so that upon its movement it engages and moves said control lever, and means for mounting said inner support within said casing so that said formations upon said shutter lever and upon said operating member engage each other and said control lever is disposed in position to be engaged by said exposure button.

2. In a camera, a front enclosing casing open at the back and with a front wall in which an exposure aperture is formed, a rear casing separable from said front casing, said rear casing having an open front, means for locking said rear casing and said front casing together so that a single complete enclosure is formed, said front and rear casings having re-entrant curves upon vertical axes adjacent each corner thereof, the formations thus created being relatively close to each other and aligned so that when said casings are locked together said curved portions can be firmly grasped by the fingers and thumb by one hand of a photographer whereby the camera can be readily held in picture-taking position, an inner support having a front surface and a rear surface and having openings in each of said surfaces, said inner support being adapted to be mounted in said front casing and when so mounted having a first of said openings adjacent the rear opening of said front casing and a second of said openings adjacent said exposure aperture said openings and said aperture being aligned, means for mounting said inner support within said front casing, a shutter mounted upon said front casing, means for operating said shutter, a control button accessible from the exterior of the rearward portion of the front wall of said front casing adjacent one of said curves, means connecting said button and said shutter operating means for operating said shutter control button, a take-up device, a take-up button accessible from the exterior of said rearward portion of said front casing, a connection between said take-up button and said take-up device, means for supporting a delivery spool of film adjacent one side of said inner support, means for supporting a take-up spool of film adjacent the other side of said inner support, both of said spools being supported upon vertical axes and being partly disposed within said formations and said means being so disposed that said take-up spool is engaged and operated by said take-up device and the film as it extends between said spools passes over said first opening in said inner support, and a photographic lens mounted in said second opening in said inner support in alignment with said shutter.

3. In a camera, an outer enclosing two-part casing, said casing having a front wall and a back wall, an exposure aperture being formed in said front wall and a top and bottom and two side walls joining said front and back walls, said walls then forming an enclosure, an inner support in the form of a frustum of a pyramid, operable parts of the camera being mounted upon said frustum, said casing at each vertical edge thereof being formed into a reentrant curve upon a vertical axis, said respective curves at corresponding edges of the camera being aligned with each other and forming a pair, a portion of said front and back walls including said curves being disposed at such a distance from each other and each of the pairs of said aligned protuberances being of such size and shape that they may be firmly grasped by the thumb and some of the fingers of one hand of a photographer whereby the camera may be held in picture taking position, said casing being separable into two parts, said frustum being supported by the forward part of said casing with its smaller base adjacent said aperture and extending rearwardly therefrom and with its larger base disposed beyond said forward part and accessible when the rearward part is removed therefrom, said larger base embodying guiding surfaces bounding an aperture the center of which is aligned with the center of said aperture in said front wall, means mounted upon said frustum for supporting a film as it is moved along said guiding surfaces, means for moving the film, means for removably connecting said forward and rearward parts, said smaller base being formed with an aperture which is in alignment with said aperture in said front wall, and a lens mounted within said aperture of said smaller base.

4. In a camera, an outer enclosing two-part casing, said casing having a front wall and a back wall, an exposure aperture being formed in said front wall and a top and bottom and two side walls joining said front and back walls, said walls then forming an enclosure, an inner support in the form of a frustum of a pyramid, operable parts of the camera being mounted upon said frustum, a control member for at least one of said operable parts, one portion of said member being disposed exteriorly of said enclosure and another portion extending therewithin, mechanism connecting the internal portion of said member and at least one of said parts, said casing at each vertical edge thereof being formed into a reentrant curve upon a vertical axis, said respective curves at corresponding edges of the camera being aligned with each other and forming a pair, when the two parts of said casing are in assembled relation a portion of said front and back walls including said curves being disposed at such a distance from each other and each of the pairs of said aligned curves being of such size and shape that they may be firmly grasped by the thumb and some of the fingers of one hand of a photographer whereby the camera may be held in picture taking position, said member being so disposed adjacent a forward one of said curves that it can be operated by a finger of a photographer as he holds the camera in picture taking position, said casing being separable into two parts, said frustum being supported by the forward part of said casing with its smaller base adjacent said aperture and extending rearwardly therefrom and with its larger base disposed beyond said forward part and accessible when the rearward part is removed therefrom, said larger base embodying guiding surfaces bounding an aperture the center of which is aligned with the center of said aperture in said front wall, means mounted upon said frustum for supporting a film as it is moved along said guiding surfaces, said supporting means being so disposed that at least a portion of the film is disposed within said curves, means for moving the film, means for removably connecting said forward and rearward parts, said smaller base being formed with an aperture which is in alignment with said aperture in said front wall, and a lens mounted within said aperture of said smaller base.

5. In a camera, a housing, said housing having a front wall and a back wall and side walls and a top and a bottom wall joining said front and back walls, said front wall having an integral forwardly projecting rigid extension, said walls together thus forming an enclosure generally T-shaped in top plan, said forward portion of said front wall having an aperture formed therein, a lens disposed adjacent said aperture and in alignment therewith, an operable shutter, means for mounting said shutter parallel to and adjacent that central portion of the front wall which is a part of said extension for movement in a plane normal to and intersecting the optical axis of said lens and said aperture for alternatively opening and closing said aperture, a control button for said shutter disposed upon one of the relatively rearward and laterally extending portions of said front wall, and means for operating said shutter by the movement of said button, said operating means including a first link one end of which is connected to said shutter and movable in a vertical plane parallel to and adjacent said forward portion of said front wall and a second link movable in a horizontal plane parallel to and adjacent said top wall, operative connections between said button and one end of said second link whereby the movement of said button moves said second link in said horizontal plane, and a connection between the other end of said second link and the end of said first link other than that connected to said shutter for operating said first link and said shutter by the movement of said button transmitted to said second link.

6. In a camera, a housing, said housing having a front wall and a back wall and side walls and a top and a bottom wall joining said front and back walls, said front wall having an integral forwardly projecting rigid extension, said walls together thus forming an enclosure generally T-shaped in top plan, said forward portion of said front wall having an aperture, a lens in alignment therewith, an operable shutter in alignment with said aperture, means for mounting said shutter parallel to and adjacent that central portion of the front wall which is a part of said extension for movement normal to and intersecting the optical axis of said lens and said aperture for alternatively opening and closing said aperture, a control button for said lens disposed upon one of the relatively rearward and laterally extending portions of said front wall and movable in a direction parallel to the longitudinal axis of said lens, and means for operating said shutter by such movement of said button, said operating means including a first link connected to said shutter and movable in a vertical plane parallel to said front wall, a second link connected to said first link and pivotally movable in a horizontal plane, said second link being movable in a plane parallel to said top wall and generally L-shaped with one or a first leg disposed adjacent said button and operatively engageable by its operative movement as aforesaid and the other or second leg of the L being disposed adjacent said first link, and a connection between said second leg and said first link whereby when said second lever is rocked by said button said first lever is moved and said shutter is operated.

7. In a camera, a housing, said housing having a front wall and a back wall and side and top and bottom walls joining said front and back walls, said front wall having an integral forwardly projecting rigid extension, said walls together thus forming an enclosure which is generally T-shaped in top plan, said forward central portion of said front wall embodied in said extension having an aperture formed therein, a lens disposed adjacent said aperture and in alignment therewith, an operable shutter aligned with said lens and said aperture for alternatively opening and closing said aperture, protuberances upon vertical axes being formed adjacent each point of junction between said side and back walls, the relatively rearward and laterally extending portions of said front wall being disposed relatively close to said back wall, protuberances upon vertical axes being formed in said front wall opposite said protuberances in said back wall, said protuberances which are oppositely disposed adjacent the same side wall being of such size and shape that they may be readily and firmly grasped by fingers and thumb of one hand of a photographer, a control button for said shutter disposed upon one of said relatively rearward and laterally extending portions of said front wall adjacent one of said protuberances, and linkage extending along a wall of said rigid extension connecting said button and said shutter for operating said shutter upon the movement of said button, whereby a photographer may firmly hold the camera and make an exposure without obscuring the lens by a portion of a hand with which he operates the camera.

8. In a camera having an outer supporting casing, an inner support, means for mounting said inner support within said supporting casing, and a shutter mounted upon said casing, means for operating said shutter mounted upon said casing, a control member mounted upon said casing at a point relatively distant from said shutter and accessible from the outside of said casing; means for operatively connecting said control member and said shutter operating means, said connecting means being mounted in part upon said casing and in part upon said inner support and including instrumentalities having interlocking formations in line with each other and of such configuration that the mounting of said inner support within said enclosing support operatively interlocks said connecting means and said operating means whereby said shutter can be operated by said control member.

9. In a camera, an outer supporting casing having a front wall with an aperture therein, an inner support, a shutter mounted upon said casing for alternatively opening and closing said aperture, a movable control member mounted upon said casing at a point relatively distant from said shutter and accessible from the exterior thereof, and means for operatively connecting said control member and said shutter whereby said shutter is operated by the movement of said control member, said connecting means including a driving and a driven member, said driving member being positioned upon said support for movement relatively thereto and having one end which is operable by said control member, said driven member having one end operatingly engaging said shutter, said ends of said members other than those previously mentioned having cooperating formations which upon their engagement enable said driven member to be operated by said driving member thereby operating said shutter, and means for mounting said inner support within said external casing with said formations in alignment so that they engage whereby said shutter may be operated by said control member.

10. In a camera, an outer enclosing casing, an inner support, said casing having a front wall having an aperture, a movable shutter, means for mounting said shutter adjacent said front wall so that the movement of said shutter opens and closes said aperture, a movable operating plate disposed adjacent said shutter and said front wall and parallel to each thereof, mechanism actuated by the movement of said plate for moving said shutter, a control lever mounted upon said inner support for movement relatively thereto, said plate and said lever having cooperating formations whereby upon the engagement thereof said plate can be operated by said lever, means for mounting said inner support within said outer casing with said formations in alignment so that said formations engage, and control means accessible from the outside of said casing and extending therewithin and operatively connected with said lever for moving said lever whereby said shutter is operated by said control means.

11. In a camera, an outer enclosing support, an inner support, said enclosing support having a front wall with an opening, a mounting plate, means for fixing said mounting plate adjacent the inner surface of said front wall and parallel thereto, said plate being formed with an opening aligned with said opening in said front wall, a movable shutter for alternatively exposing and obstructing said openings, means for movably mounting said shutter upon said plate parallel thereto, a driven member for operating said shutter, said driven member being disposed parallel to said plate and said shutter and being pivotally mounted upon said fixed mounting plate at a point distant from said pivotal mounting of said shutter, said driving and driven members embodying cooperating formations which upon their engagement permit the operation of said driven member by said driving member, means for mounting said support within said enclosing casing in alignment with said plate so that said formations engage, and means including a member external to said casing for operating said driving member.

12. In a camera, an outer supporting casing, an inner support, said inner support being smaller than said casing and being adapted to fit therewithin, said casing having a front wall and a back wall joined by top, bottom and side walls, said front wall having an aperture, the top surface of said inner support being slightly spaced from the inside surface of said top wall of said casing when said support is disposed within said casing, a movable shutter, means for mounting said shutter upon said casing parallel to and adjacent said front wall of said casing for movement in a vertical plane so that the movement of said shutter opens and closes said aperture, the front surface of said inner support being spaced from the inner surface of said front wall when said support is disposed within said casing, a pivoted operating plate disposed upon said casing adjacent said shutter and said front wall and parallel to each thereof and extending to a point adjacent said top wall and movable in a vertical plane, said shutter and plate being disposed between said inner surface of said front wall and said front wall surface of said support when said support is mounted within said casing, a connection between said plate and said shutter for moving said shutter upon the movement of said plate, a control lever mounted upon said inner support adjacent its top surface for movement in a horizontal plane and relatively thereto, said plate and said lever having cooperating formations whereby upon the engagement thereof said plate can be operated by the movement of said lever, means for mounting said inner support within said outer casing so that said formations engage, and means disposed upon the outside of the camera and operatively connected with said lever for moving said lever whereby said shutter is operated by the movement of said lever.

13. In a camera having a front wall with an exposure aperture, a lens aligned with said aperture, a movable shutter for said lens, and means for mounting said shutter adjacent said front wall and parallel thereto for movement across said aperture for alternatively opening and closing said aperture; and control means for said shutter; said control means including a lever having a frontward formation movable in a plane generally parallel to the optical axis of said lens and a rearward formation laterally off-set from said frontward formation, an operating link connecting an end of said front formation relatively remote from said second formation and said shutter for moving said shutter upon the movement of said lever, and a control button mounted upon said camera for movement in a direction generally parallel to the optical axis of said lens and engaging the end of said rearward off-set formation relatively remote from said front formation for operating said control means whereby said shutter is operated by the movement of said button in said direction.

14. In a camera, a housing, said housing having a front wall of which one central portion is disposed in advance of another portion and connected thereto thereby forming a housing which in top plan is T-shaped of which said advanced portion is the leg, an exposure opening centrally disposed in that portion of said front wall which encloses said advanced portion, a top wall joined to said front wall at right angles to the plane thereof, a lens aligned with said exposure opening, a movable shutter for said lens, means for mounting said shutter adjacent said forward portion of said front wall and parallel thereto and normal to and intersecting the optical axis of said lens and said aperture so that the movement of said shutter alternatively opens and closes said aperture, motion transmitting mechanism mounted for movement in a horizontal plane generally parallel to said top wall, a control button disposed in said rearward portion of said front wall or in the cross bar of the T and movable along an axis parallel to the plane of said top wall and operatively engaging a rearward portion of said motion transmitting mechanism, and a connection between a forward portion of said control mechanism and said shutter whereby the movement of said motion transmitting mechanism operates said shutter.

15. In a camera, a generally rectangular housing, said housing having a front wall, a back wall, a top wall, a bottom wall and side walls between said front and back walls, said front wall being formed with an aperture, a lens aligned with said aperture, a movable shutter for said lens, means for mounting said shutter upon said front wall for movement in a vertical plane parallel to and adjacent said front wall and normal to and intersecting the optical axis of said lens and said aperture, a movable control lever disposed in a plane normal to that of said shutter and adjacent and parallel to said top wall, a motion transmitting connection between said movable control lever and said shutter whereby the movement of said control lever operates said shutter, and a button accessible from the outside of said housing at a point relatively remote and to the rear of said shutter and operatively connected to said control lever for moving said control lever for operating said shutter.

16. In a camera, a substantially rectangular housing, said housing having a front wall with an opening and enclosing walls joining said front wall at substantially a right angle thereto, a mounting plate, means for fixing said mounting plate adjacent the inner surface of said front wall and parallel thereto, said plate being formed with an opening aligned with said opening in said front wall, a movable shutter for alternatively exposing and obstructing said openings, means for movably mounting said shutter upon said plate parallel thereto for movement relatively thereto, a driven member for operating said shutter, said driven member being disposed parallel to said plate and said shutter and being pivotally mounted upon said fixed mounting plate at a point distant from said mounting of said shutter, a driving member pivotally mounted adjacent one of said enclosing walls for movement in a plane parallel thereto, an operating connection between said members for operating said driven member by said driving member, and means external to said casing for operating said driving member.

17. In a camera, a housing, said housing having a front wall with an opening, a mounting plate, means for fixing said mounting plate adjacent the inner surface of said front wall and parallel thereto, said plate being formed with an opening aligned with said opening in said front wall, a movable shutter for alternatively exposing and obstructing said openings, a first pivot pin for mounting said shutter upon said front support, said first pivot pin extending through said shutter plate and into said front wall and assisting in fixing said mounting plate to said front wall, said mounting plate and said front wall having openings to accommodate said first pivot pin, an operating plate for said shutter, a second pivot pin for said operating plate disposed relatively distantly from said first pivot pin and extending through said mounting plate into said front wall thereby cooperating with said first pivot pin for fixing said mounting plate to said housing, motion transmitting mechanism connecting said operating plate and said shutter for operating said shutter upon the movement of said plate, and means operable from the exterior of said housing for moving said operating plate.

18. In a camera, a housing, said housing having a front wall with an opening, a top wall and other enclosing walls completing said housing, a mounting plate, means for fixing said mounting plate adjacent the inner surface of said front wall and parallel thereto, said plate being formed with an opening aligned with said opening in said front wall, a movable shutter for alternatively exposing and obstructing said openings, a first pivot pin for mounting said shutter upon said front support, said first pivot pin extending through said shutter plate and into said front wall and assisting in fixing said mounting plate to said front wall, said mounting plate and said front wall having openings to accommodate said first pivot pin, an operating plate for said shutter, a second pivot pin for said operating plate disposed relatively distantly from said first pivot pin and extending through said mounting plate into said front wall thereby cooperating with said first pivot pin for fixing said mounting plate to said housing, said shutter, said operating plate, said mounting plate and said front wall being parallel and said operating plate being movable in a plane parallel to said mounting plate, motion transmitting mechanism connecting said operating plate and said shutter for operating said shutter upon the movement of said plate, a lever pivoted upon the under side of said top wall and movable in a plane parallel thereto, motion transmitting mechanism connecting said lever and said operating plate for moving said plate and operating said shutter upon the movement of said lever, and means operatively connected to said lever and having a portion accessible from the exterior of said housing relatively remote from said opening for moving said lever.

19. In a camera, a housing having a front wall and a back wall, each of said walls being of irregular configuration and an exposure aperture being formed in said front wall, and a top and a bottom wall joining said front and back walls, said walls together thus forming an enclosure, operable parts of the camera being mounted in said enclosure, a lens aligned with said aperture, said front wall at each vertical edge thereof where it joins each of said side walls being formed into a protuberance which is curvilinear upon a vertical axis and said back wall and each vertical edge thereof where it joins each of said side walls also being formed into a similar protuberance which is curvilinear upon a vertical axis, said respective protuberances at corresponding edges of said front wall and said back wall and each one of said side walls respectively being opposite each other and forming a pair and said front and back walls thereby embodying oppositely disposed re-entrant curves, the portions of said front and back walls including said protuberances being disposed at such a distance from each other and each of the pairs of said aligned protuberances being of such size and shape that they may be firmly grasped by the fingers and thumb of one hand of the photographer whereby the camera may be readily and steadily held in picture taking position, means for holding a cell of a dry battery in at least one of said protuberances, and a connection to which a flash-gun may be attached from said cell whereby said flash-gun may be powered from said camera.

FREEMAN H. OWENS.

REFERENCES CITED

The following references are of record in the file of this patent:

UNITED STATES PATENTS

| Number | Name | Date |
|---|---|---|
| 446,374 | Whitney | Feb. 10, 1891 |
| 1,139,023 | Folmer | May 11, 1915 |
| 1,260,356 | Folmer | Mar. 26, 1918 |
| 1,262,657 | Ford | Apr. 16, 1918 |
| 1,272,635 | De Marco | July 16, 1918 |
| 1,402,167 | Kingsbury | Jan. 3, 1922 |
| 1,830,168 | Josepho | Nov. 3, 1931 |
| 1,855,269 | Victor | Apr. 26, 1932 |
| 1,923,997 | Orlando | Aug. 22, 1933 |
| 2,017,979 | Mayo | Oct. 22, 1935 |
| 2,020,384 | Stone | Nov. 12, 1935 |
| 2,029,476 | Githens | Feb. 4, 1936 |
| 2,096,856 | Nuchterlein | Oct. 27, 1937 |
| 2,102,574 | Reason | Dec. 14, 1937 |
| 2,187,246 | Nerwin | Jan. 16, 1940 |
| 2,196,604 | Galter | Apr. 9, 1940 |
| 2,225,433 | Goldberg | Dec. 17, 1940 |
| 2,229,606 | Hineline | Jan. 21, 1941 |
| 2,233,006 | Goldhammer | Feb. 25, 1941 |
| 2,233,389 | Kende et al. | Feb. 25, 1941 |
| 2,236,069 | Robinson | Mar. 25, 1941 |
| 2,238,371 | Pollock | Apr. 15, 1941 |
| 2,239,379 | Bucky | Apr. 22, 1941 |
| 2,280,561 | Wappler | Apr. 21, 1942 |
| 2,282,850 | Brownscombe | May 12, 1942 |
| 2,304,887 | Crumrine | Dec. 15, 1942 |
| 2,320,423 | Githens et al. | June 1, 1943 |
| 2,329,011 | Steiner | Sept. 7, 1943 |
| 2,335,439 | Nerwin et al. | Nov. 20, 1943 |
| 2,358,796 | Edgerton | Sept. 26, 1944 |
| 2,417,240 | Crumrine | Mar. 11, 1947 |

FOREIGN PATENTS

| Number | Country | Date |
|---|---|---|
| 453,817 | Great Britain | Sept. 18, 1936 |
| 455,859 | Great Britain | Oct. 26, 1936 |